US012530520B2

(12) United States Patent
Rutler

(10) Patent No.: US 12,530,520 B2
(45) Date of Patent: Jan. 20, 2026

(54) DOCUMENT STAMPING SYSTEM AND METHOD

(71) Applicant: Interactive Media, LLC, Olathe, KS (US)

(72) Inventor: Jay Rutler, Overland Park, KS (US)

(73) Assignee: Interactive Media, LLC, Olathe, KS (US)

( * ) Notice: Subject to any disclaimer, the term of this patent is extended or adjusted under 35 U.S.C. 154(b) by 183 days.

(21) Appl. No.: 15/958,157

(22) Filed: Apr. 20, 2018

(65) Prior Publication Data

US 2018/0373680 A1 Dec. 27, 2018

Related U.S. Application Data

(60) Provisional application No. 62/524,652, filed on Jun. 26, 2017.

(51) Int. Cl.
G06F 40/106 (2020.01)
G06F 40/109 (2020.01)
G06F 40/114 (2020.01)
G06T 11/60 (2006.01)
G06F 40/166 (2020.01)

(52) U.S. Cl.
CPC .......... *G06F 40/106* (2020.01); *G06F 40/109* (2020.01); *G06F 40/114* (2020.01); *G06T 11/60* (2013.01); *G06F 40/166* (2020.01)

(58) Field of Classification Search
CPC .... G06F 40/106; G06F 9/445; G06F 17/2235; G06T 11/60
See application file for complete search history.

(56) References Cited

U.S. PATENT DOCUMENTS

| 5,540,507 | A | * | 7/1996 | Niwa | G06K 15/02 400/83 |
| 5,583,645 | A | * | 12/1996 | Vegeais | H04N 1/393 358/296 |
| 5,957,600 | A | * | 9/1999 | Ju | B41J 11/003 400/708 |
| 5,960,448 | A | | 9/1999 | Reichek et al. | |
| 6,298,358 | B1 | * | 10/2001 | Gormish | G06T 3/4023 715/236 |

(Continued)

OTHER PUBLICATIONS

Daniel Hatter, "How to Resize a Microsoft Doucment" Nov. 13, 2013, Demand Media https://web.archive.org/web/20131013110637/ https://smallbusiness.chron.com/resize-microsoft-office-document-66462.html (Year: 2013).*

(Continued)

*Primary Examiner* — Howard Cortes
(74) *Attorney, Agent, or Firm* — AVEK IP, LLC; Mark C. Young

(57) ABSTRACT

Methods and systems for document processing are described. In one embodiment, a processor can receive a document having document contents. The document can include a first aspect ratio, and the document contents can have the first aspect ratio. The processor can create a margin to the document by increasing a height or a width of the document, thereby giving the document a second aspect ratio. The processor can also insert a label within the margin. In one embodiment, the document contents can maintain the first aspect ratio after the margin is created. Additional methods and systems are disclosed.

30 Claims, 19 Drawing Sheets

(56) References Cited

U.S. PATENT DOCUMENTS

| | | |
|---|---|---|
| 7,103,602 B2 | 9/2006 | Black et al. |
| 7,581,176 B2 | 8/2009 | Wilson |
| 7,805,673 B2 | 9/2010 | der Quaeler et al. |
| 7,839,532 B2 | 11/2010 | Brawn et al. |
| 8,159,717 B2 | 4/2012 | Nakagama et al. |
| 8,386,945 B1 | 2/2013 | Hansen et al. |
| 8,503,030 B2 | 8/2013 | Goldwater et al. |
| 9,068,920 B2 | 6/2015 | Churilla |
| 9,436,416 B2 | 9/2016 | Yu et al. |
| 10,839,332 B1* | 11/2020 | McBride .............. G06K 1/121 |
| 2002/0064307 A1* | 5/2002 | Koga .................... G06T 3/40 382/176 |
| 2005/0058486 A1* | 3/2005 | Yamanaka ........... B41J 11/008 400/76 |
| 2005/0058978 A1* | 3/2005 | Benevento, II ......... G09B 7/02 434/362 |
| 2005/0185225 A1 | 8/2005 | Brawn et al. |
| 2006/0015813 A1* | 1/2006 | Chung ................ G06F 40/117 715/201 |
| 2006/0200752 A1* | 9/2006 | Sellers ................ G06F 40/114 715/209 |
| 2006/0262336 A1* | 11/2006 | Venkatachalam ..... G06F 3/1258 358/1.13 |
| 2007/0139663 A1* | 6/2007 | Chang .................. G06F 30/30 358/1.1 |
| 2007/0158425 A1* | 7/2007 | Matsuura ............... G06K 1/14 235/432 |
| 2007/0188805 A1* | 8/2007 | Nakagama ........... G03G 15/36 358/1.16 |
| 2008/0014906 A1* | 1/2008 | Tysowski ............. G06F 16/51 455/412.1 |
| 2008/0060540 A1* | 3/2008 | Maeda ................. B41J 11/008 101/486 |
| 2008/0062438 A1* | 3/2008 | Lin ..................... G06T 3/4023 358/452 |
| 2008/0120209 A1* | 5/2008 | Krolczyk ............. G06Q 10/10 705/30 |
| 2008/0247629 A1* | 10/2008 | Gilder ................. G06Q 20/04 382/137 |
| 2009/0024942 A1 | 1/2009 | Pendergast et al. |
| 2009/0307322 A1* | 12/2009 | Iwasawa ........... H04N 1/00209 709/206 |
| 2010/0058166 A1* | 3/2010 | Chikyu ................ G06F 40/169 715/277 |
| 2010/0098338 A1* | 4/2010 | Kido .................... G06T 1/00 382/199 |
| 2010/0289820 A1* | 11/2010 | Hoyer ................ G06F 3/04886 345/619 |
| 2011/0167381 A1* | 7/2011 | Kahn .................... G06F 40/258 715/786 |
| 2011/0252039 A1* | 10/2011 | White ................... G06F 40/154 707/741 |
| 2012/0139229 A1* | 6/2012 | Matsubara ............... G09F 3/02 283/70 |
| 2012/0254773 A1* | 10/2012 | Viswanathan ...... G06F 3/04883 715/753 |
| 2012/0278700 A1* | 11/2012 | Sullivan ................. G06F 40/16 715/235 |
| 2013/0132455 A1* | 5/2013 | Mangini ................ G06Q 10/10 709/201 |
| 2013/0305149 A1 | 11/2013 | Dimitrov et al. |
| 2013/0328786 A1* | 12/2013 | Hinckley ............ G06F 3/04883 345/173 |
| 2013/0334300 A1* | 12/2013 | Evans ............... H04N 21/47217 235/494 |
| 2014/0160049 A1* | 6/2014 | Shin ...................... G06F 3/0486 345/173 |
| 2014/0184648 A1* | 7/2014 | Claydon ................. G06F 3/14 345/649 |
| 2014/0215324 A1* | 7/2014 | Siegel ................. G06F 40/103 715/256 |
| 2014/0240735 A1* | 8/2014 | Salgado ............. G06K 15/1815 358/1.13 |
| 2014/0344662 A1* | 11/2014 | Isabel ................... G06F 40/171 715/230 |
| 2015/0016735 A1* | 1/2015 | Kikuchi .................... G06T 9/00 382/232 |
| 2015/0067469 A1* | 3/2015 | Shuto ................... G06F 40/169 715/232 |
| 2015/0067483 A1* | 3/2015 | Demiya ................ G06F 40/171 715/249 |
| 2015/0324954 A1* | 11/2015 | Palanivel .................. G06T 3/60 358/474 |
| 2015/0331588 A1* | 11/2015 | Ishida ................... G06F 40/166 715/765 |
| 2015/0341509 A1* | 11/2015 | Yamada ............... H04N 1/0066 358/474 |
| 2016/0259766 A1* | 9/2016 | Ivanov ................... G06F 40/169 |
| 2018/0032493 A1* | 2/2018 | Raleigh ................ G06Q 10/101 |
| 2018/0122044 A1* | 5/2018 | Bai ....................... G06T 3/4038 |

OTHER PUBLICATIONS

"Bates Numbering Across a PDF Portfolio," Acrobat for Legal Professionals, Created Jul. 15, 2008.

\* cited by examiner

DOCUMENT STAMPING SYSTEM AND METHOD

CROSS REFERENCE TO RELATED APPLICATION

This application claims the benefit of U.S. Provisional Application No. 62/524,652, filed Aug. 3, 2016, which is hereby incorporated by reference in its entirety.

FIELD

The present disclosure relates generally to the technical field of manipulating documents and document images. In a specific example, the present disclosure may relate to adding a margin to a document for the purposes of adding a Bates number to the document.

BACKGROUND

Conventional systems and methods are capable of adding Bates codes to documents. However, conventional systems and methods require user decisions and intervention, especially in handling problems like over-marking. User input prevents a computer from handling large volumes of documents efficiently.

Conventional systems and methods add Bates codes to documents by (1) searching for an adequate amount of white space in a document and placing Bates stamp data on the discovered white space; (2) adding white space behind text data, thereby obscuring the document, (3) add text with no white space; or (4) shrinking document contents to create white space at the margins as a border. This fourth method is illustrated in FIGS. 1 and 2. As shown in FIG. 1, a document 100 includes a photograph 102, and the photograph 102 has been shrunk to create a margin 104. Both the document 100 and the photograph 102 may have a standardized aspect ratio (e.g. 0.774 based on an 8.5×11 inch paper size). The document 100 in FIG. 1 lacks white space or margins 104 large enough to place a readable Bates number on the document. As shown in FIG. 1, an illegibly small Bates number 106 is included in the very small margin 104. Furthermore, the margin 104 surrounds the photograph 100 even though the Bates number 106 is only place at the bottom margin 104.

Like FIG. 1, FIG. 2 illustrates a shrunk photograph 102A in a document 100A. The shrunk photograph 102A creates slightly larger margins 104A on all sides of the shrunk photograph 102A. The margins 104A are large enough to include a readable Bates number 106A. Like FIG. 1, FIG. 2 needlessly includes margins 104A on all sides of the photograph 102A even though only one margin was necessary for the inclusion of the Bates code 106.

Therefore, there is a need in the art for a document management system that adds Bates numbers without needless user intervention and without unnecessary margins.

DETAILED DESCRIPTION

Example methods and systems for adding labels to documents are described. In the following description, for purposes of explanation, numerous specific details are set forth in order to provide a thorough understanding of example embodiments. It will be evident, however, to one of ordinary skill in the art that embodiments of the present disclosure may be practiced without these specific details.

In general, the systems and methods described herein include a method for adding a margin to a document without fundamentally altering a document's size or contents. The systems and methods described herein are capable of adding a margin to only one side of a document to minimize the amount of distraction to the original document contents. The systems and methods described herein are further configured to add additional data to the document, such as a label, a barcode, metadata, a Bates code, or any other data that may be added to a newly-created margin of a document.

The systems and methods may be configured to create a stamped page without obscuring a document's contents. In embodiments that add a Bates code or Bates barcode, the systems and methods may be configured to add a readable or scannable Bates code or barcode. The location of the code or barcode may be uniform across all stamped documents (e.g. centered within a margin). In some embodiments, a stamped document with the Bates code or barcode may be used to access the original document in a presentation application, and the presentation application may display the original document without displaying the code or barcode.

The systems and methods described herein can be performed by a computer, or more specifically, by a processor of a computer. See FIG. 19 below. The processor and the computer may execute the methods described herein to minimize user input, thereby more efficiently stamping numerous documents. Furthermore, the processor executes the methods described herein to present a readable and proportionate label to a document without obscuring or distracting from the document's contents.

Figure 1:
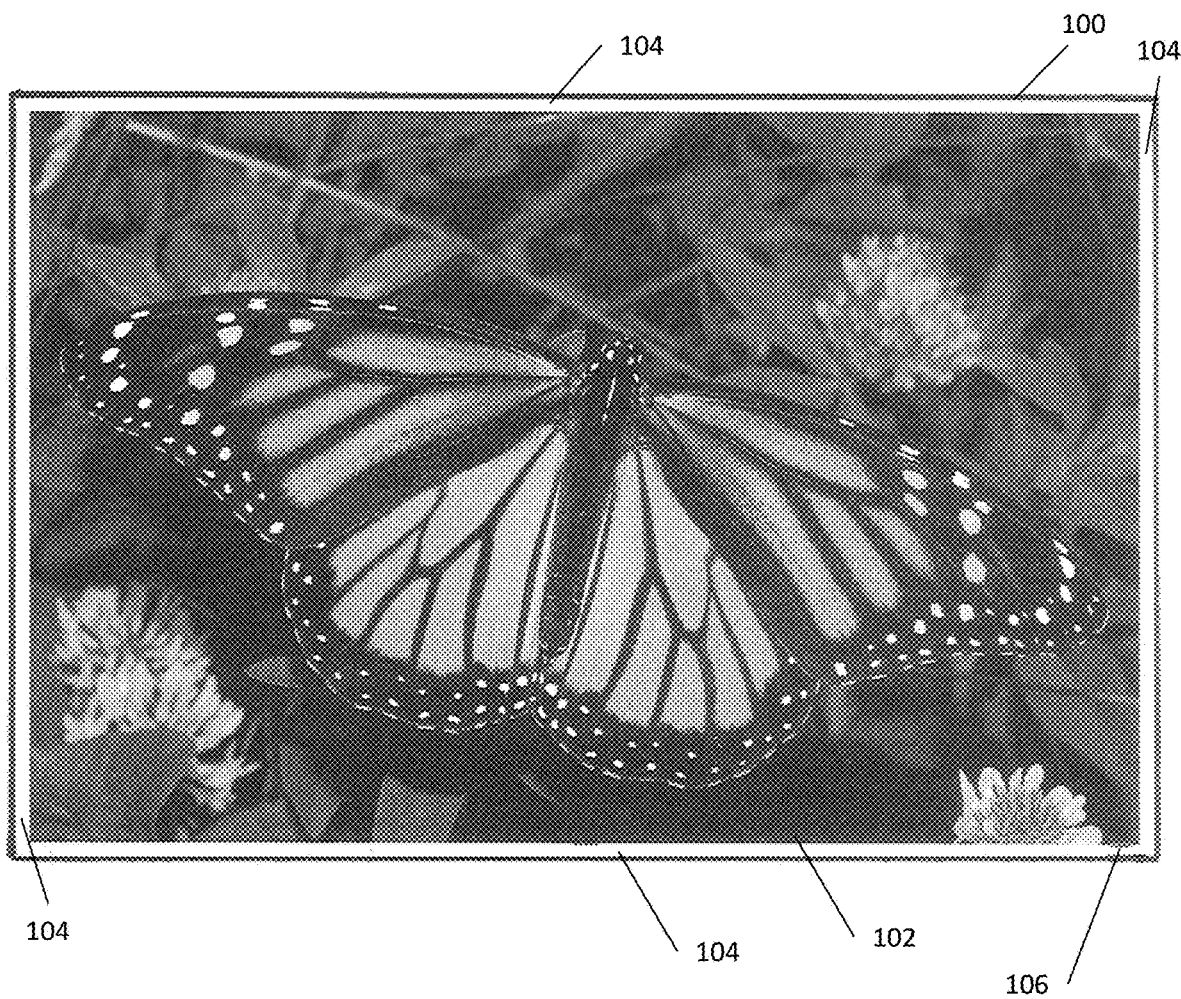
FIG. 1 is a landscape-oriented photograph modified with a conventionally added margin, according to a conventional embodiment.
Figure 2:
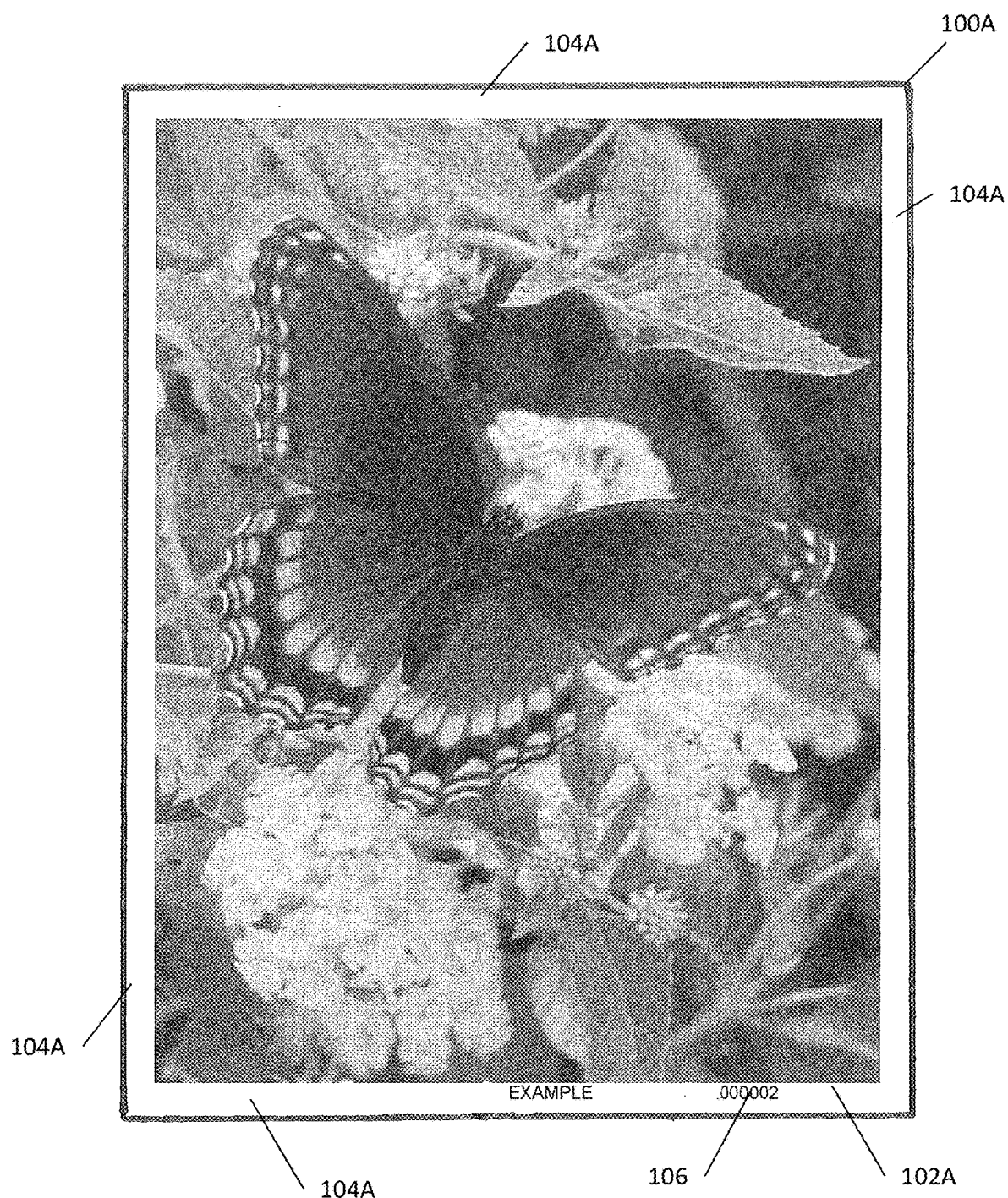
FIG. 2 is a portrait-oriented photograph modified with a conventionally added margin, according to an conventional embodiment.
Figure 3:
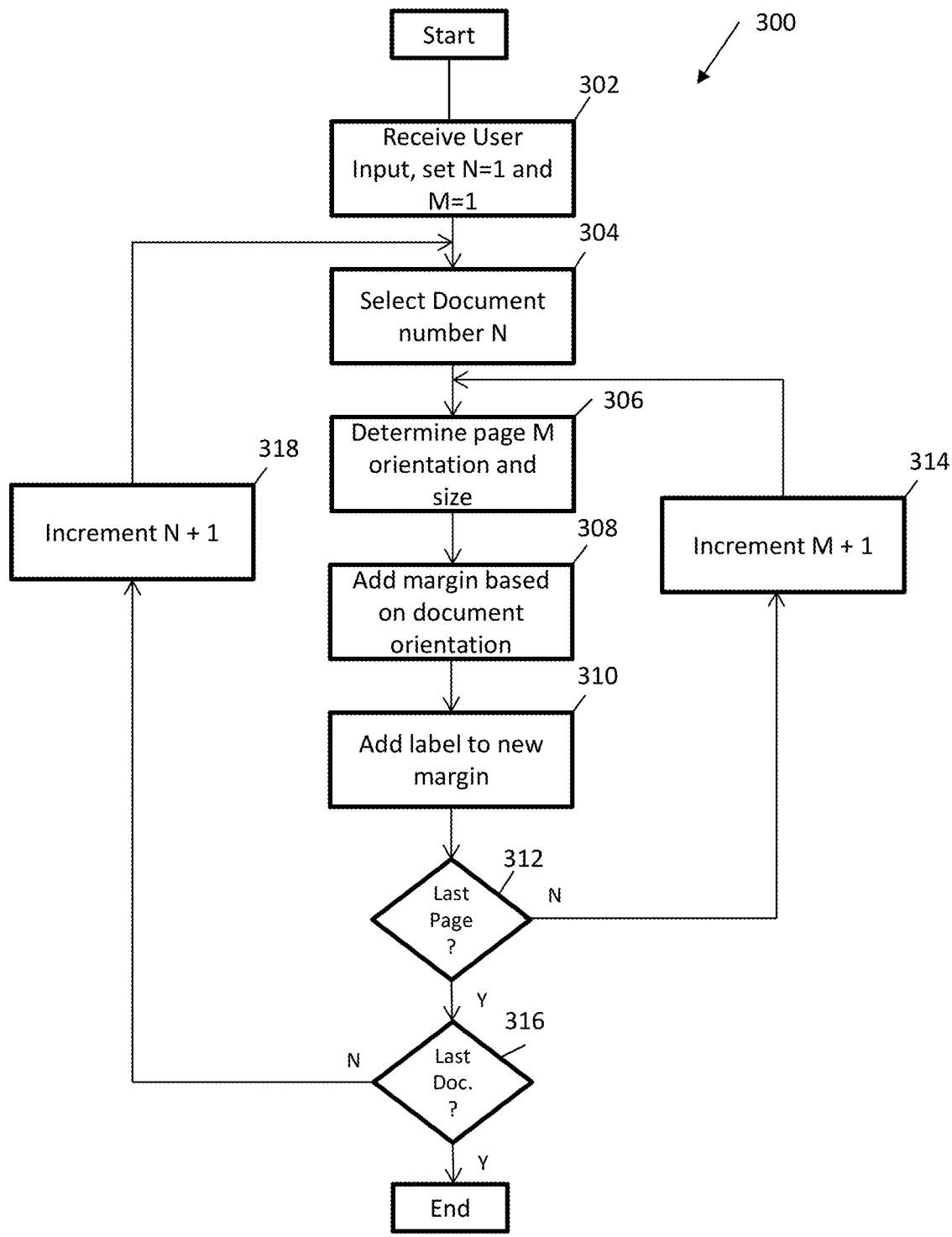
FIG. 3 is a flowchart illustrating methods for adding a margin and a label to one or more documents, according to an example embodiment.

Referring to FIG. 3, a method 300 for document stamping or adding document metadata is provided. The method 300 may begin in step 302 when the processor receives user input. The user input may specify a document file or a plurality of document files to be modified such that a Bates label or barcode is added to the documents. The user input may also specify a starting Bates code for the documents. In some embodiments, the user input may specify the starting Bates code and an ending Bates code, thereby determining a range of Bates codes for the one or more documents. In some embodiments, the processor may determine a page count for the document files or the plurality of document files and determine the ending Bates code based on the page count. In addition to receiving the starting Bates code, the processor may confirm that the starting Bates code is unassigned. The processor may further confirm that all Bates codes in the range of Bates codes are unassigned after the processor either receives the ending Bates code or determines the ending Bates code based on the page count. The processor may reference a database that stores assigned Bates codes when confirming that the Bates codes in the range of Bates codes are all unassigned. If one or more Bates codes have already been assigned, the processor may notify the user through a display that a different Bates code should be selected due to the existence of a document already having the selected Bates code. In yet another embodiment, the document file or the plurality of document files may store metadata indicating the Bates number to be added by the method 300. The processor may not receive any user input related to Bates numbering if the document file includes metadata indicating the Bates code to be added. Alternatively, the processor may not receive any user input related to Bates numbering when the Bates numbering is automatically added using a known available sequence, when the Bates number is retrieved from the database, or when the Bates numbering begins at a last known used number.

Furthermore, in step 302, the processor may set two variables (N, M) to equal 1.

Subsequently, the processor may select document N in step 304. If N=1, the processor may select the first document file. The processor may further determine a page count for document file N. In some embodiments, the processor may create a copy of document file N to use as a working copy so that the original document is not modified by the method 300.

After selecting document N, the processor may determine page number M's orientation and size in step 306. The processor may determine the document's size based on a unit of measurement (e.g. inches or centimeters) or based on a number of pixels. The processor may determine the document's size based on a fundamental document data structure (e.g. PDF) or if the document stores the size in metadata. The units of measurement may be in English units or metric units, and the processor may be configured to convert the stored units to other units of measurement (e.g. convert from inches to centimeters). In some other embodiments, the fundamental document data structure may not be a typical unit of measurement (e.g. inches or centimeters), but the unit may be points or some other unit of measurement understood by a computer. Furthermore, the processor may determine a document's orientation based on whether the document's aspect ratio is larger or smaller than 1. A document's aspect ratio may be defined as a width of the document divided by a height of the document. If the aspect ratio is greater than 1, the document is considered to have a landscape orientation, whereas if the aspect ratio is less than one, the document is considered to have a portrait orientation. If the aspect ratio is 1 (e.g. neither landscape or portrait), the processor could add white space to make the document portrait or landscape, or the processor could default to one of the portrait or landscape set of rules for aspect ratios equal to one. For example, if a document has an 8.5 inch width and an 11 inch height, the document's aspect ratio is: 8.5÷11=0.773. Because the aspect ratio is less than 1, the document is considered to have a portrait orientation. As another example, if a document has an 11" width and an 8.5" height, the document's aspect ratio is: 11÷8.5=1.294. Because the aspect ratio is greater than 1, the document is considered to have a landscape orientation.

After determining the document's size and orientation, the processor may add a margin to the document on one side of the document based on the document's orientation and size in step 308. For example, if a standard sized document has a landscape orientation, the processor may add the margin to one of the 11 inch sides. More specifically, the processor may add the margin to the bottom of the document (see FIG. 6). Alternatively, if a standard sized document has a portrait orientation, the processor may add the margin one of the 8.5 inch sides. It should be noted that creating the margin does not alter the size or aspect ratio of document contents. Instead, the margin is created by extending the document in one direction. For example, in a standard sized document (8.5×11", portrait orientation), the processor may change the size of the document by adding 0.75" to the height of the document below the document contents, thereby changing the document from an 8.5×11" document to a 8.5×11.75" document. Importantly, the original document contents remain unaltered in terms of size, shape, orientation, and aspect ratio. 0.75" of white space is merely an exemplary amount of white space to add to a document, and other margin sizes are contemplated herein.

Subsequently, the processor may add a label or code in the created margin in step 310. In some embodiments, the size of the code's font or the size of the code' image (e.g. barcode) may be based on the size of the created margin. In some embodiments, the processor may add the added code to a database that stores all Bates codes.

After adding a margin and a code to document page M, the processor may determine whether document page M is the last page in document number N in step 312. If document page M is not the last page, the processor may iterate M by 1 in step 314 and may return to step 306. If document page M is the last page, the processor, in step 316, may determine if document number N is the last document in the set of selected documents received in step 302. If document number N is not the last document, the processor may iterate N by 1 in step 318 and returns to step 304. If document number N is the last document in the set of selected documents received in step 302, the method 300 may end. In other words, the process 300 may continue until all pages of all the selected documents have a new margin and a label.

The method of FIG. 3 improves the functioning of a computer because little to no user input is required for a Bates labeling or other document stamping method. The only user input required is specification of a document or plurality of documents to be labeled. After the selection of the documents to be labeled, the computer can efficiently label all pages of all documents without any further user input. The removal of the human being still results in readable and proportional margins and labels. As such, the computer can label more documents faster than conventional methods. Therefore, the example embodiments described herein represent a technical advancement of the conventional art.

The exemplary embodiments described herein can add a margin and a label (i.e. steps 308 and 310) according to a number of different methods. The first method is described with respect to FIG. 4.

Figure 4:
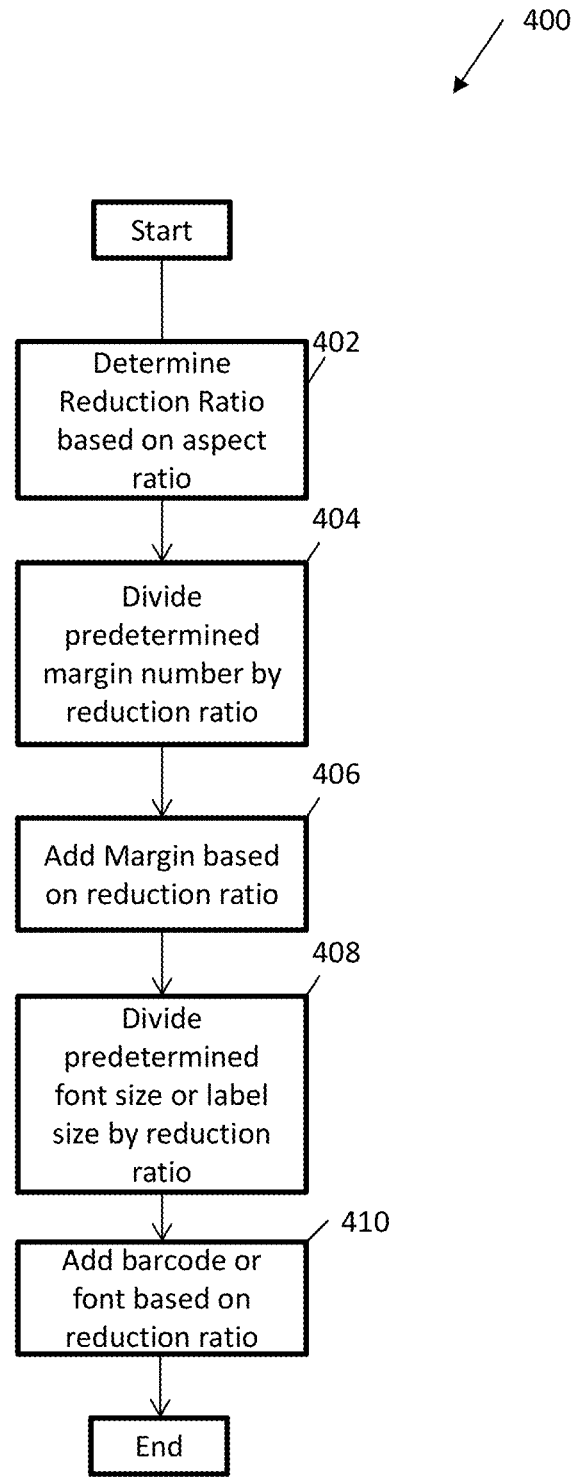
FIG. 4 is a block diagram of a flowchart illustrating a first method for adding a margin and labels to a modified document, according to an example embodiment.

Referring now to FIG. 4, a method 400 may begin in step 402 when a processor may calculate a reduction ratio for a document. The reduction ratio may be calculated by using a standard sized document's dimensions and comparing them to the document' dimensions that is getting the label. Calculating the reduction ratio may be based on the document's aspect ratio. For example, the processor may divide a document's width by 11 if the document is determined to be landscape oriented, or the processor may divide a document's width by 8.5 if the document is determined to be portrait oriented. After determining the reduction ratio, the processor may divide a predetermined margin number by the calculated reduction ratio in step 404. Subsequently, the document may create a margin by expanding the document in a predetermined direction (e.g. increasing height of document without increasing the height of the document contents) in step 406. Creating the margin may include the processor adding a proportionally sized margin to the document based on the reduction ratio. Alternatively, creating the margin may comprise the processor creating a new blank page having proportions that include the additional margin space, and the document contents, unaltered, may be added to the blank page. After adding the margin, the processor may divide a predetermined font size or label size by the reduction ratio in step 408 and may add the appropriately sized font or label in the margin in step 410. In this way, the processor may also add proportionately sized text or a proportionately sized label based on the reduction ratio.

Figure 5:
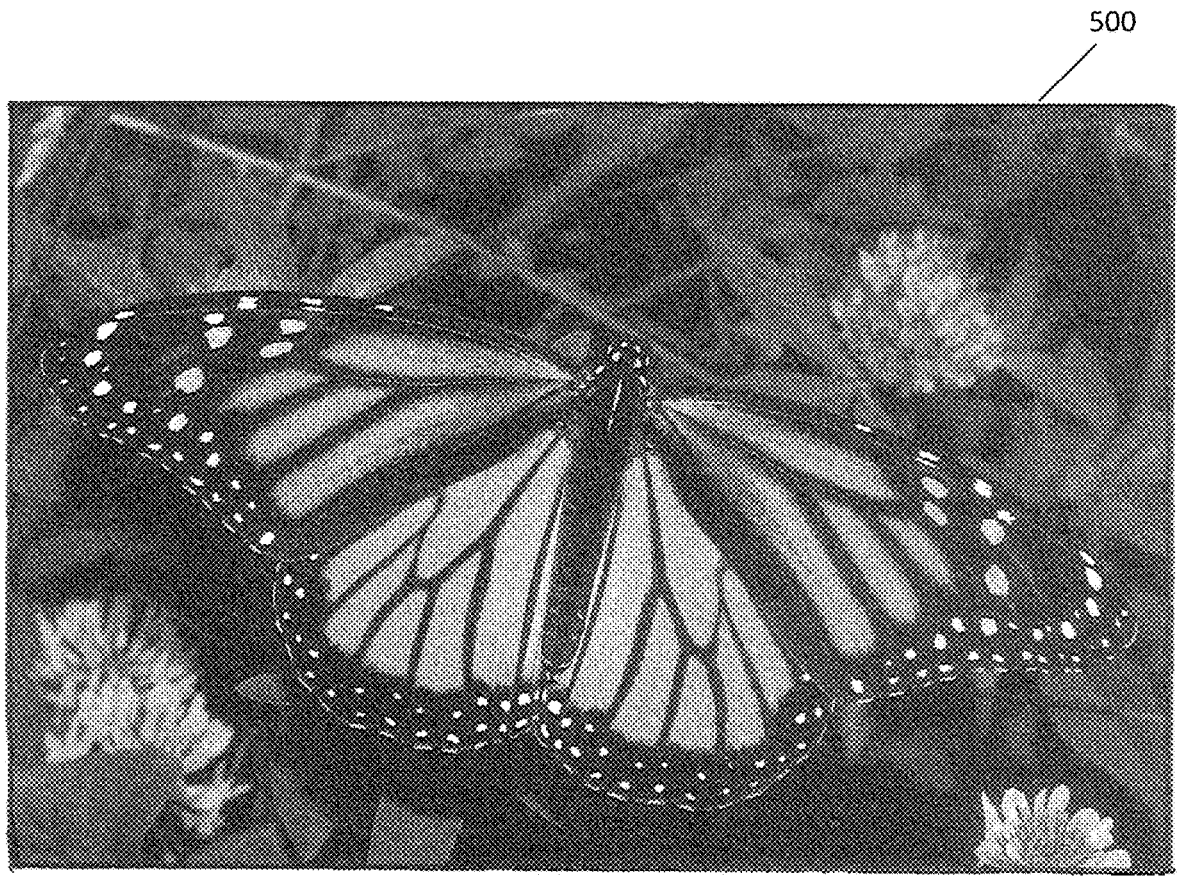
FIG. 5 is a landscape-oriented photograph, according to an example embodiment.

The method of FIG. 4 is best illustrated through example. FIG. 5 illustrates a photograph 500. For example, the size of the photograph in FIG. 5 may be 41.78"×27.78". The processor may calculate the aspect ratio of the photograph 500 by dividing the width (41.78") by the height of the photograph (27.78"), and the processor may determine that the aspect ratio is 1.504 (see Step 306 in FIG. 3). Using this aspect ratio, the processor may first determine that this photograph has a landscape orientation because the aspect ratio is greater than 1. The processor may also determine a reduction ratio for the photograph 500 by dividing a standard sized document's width (e.g. 11" for a landscape oriented document) by the photograph's width (41.78"). The reduction ratio is therefore 11÷41.78=0.263 (Step 402 in FIG. 4).

Using that reduction ratio, the processor may divide a predetermined margin size (e.g. 0.75") by the reduction ratio. The predetermined margin size may be a margin size that is determined to be an appropriate margin size for a standard sized document (e.g. 8.5"×11"). The margin size for the photograph 500 may be determined by dividing the predetermined number by the reduction ratio (0.75÷0.263=2.85") (Step 404 in FIG. 4). Therefore, a margin of 2.85" may be added to the photograph 500. The new document dimensions may be 41.78×30.63" in view of the added margin to the height of the photograph 500 (Step 406 in FIG. 4).

Still using that reduction ratio, the processor may divide a predetermined font size (e.g. font size 10) by the reduction ratio. The processor may also divide a predetermined label size (e.g. 0.5") by the reduction ratio. The predetermined font size or label size may be a font size or label size that is determined to be an appropriate (i.e. readable) size for a standard sized document (e.g. 8.5"×11"). The font size for the photograph 500 may be determined by dividing the predetermined font size by the reduction ratio (10÷0.263=38.02") (Step 408 in FIG. 4). In some embodiments, the font size may be rounded to the nearest number. The label size for the photograph 500 may be determined by dividing the predetermined label size by the reduction ratio (0.5÷0.263=1.9") (the width of the label may be widened according to the reduction ratio as well) (see Step 408 in FIG. 4). Therefore, text with a font size 38" may be added to the photograph 500 and/or a label having a height of 1.9" may be added to the photograph 500 (Step 410 in FIG. 4).

Figure 6:
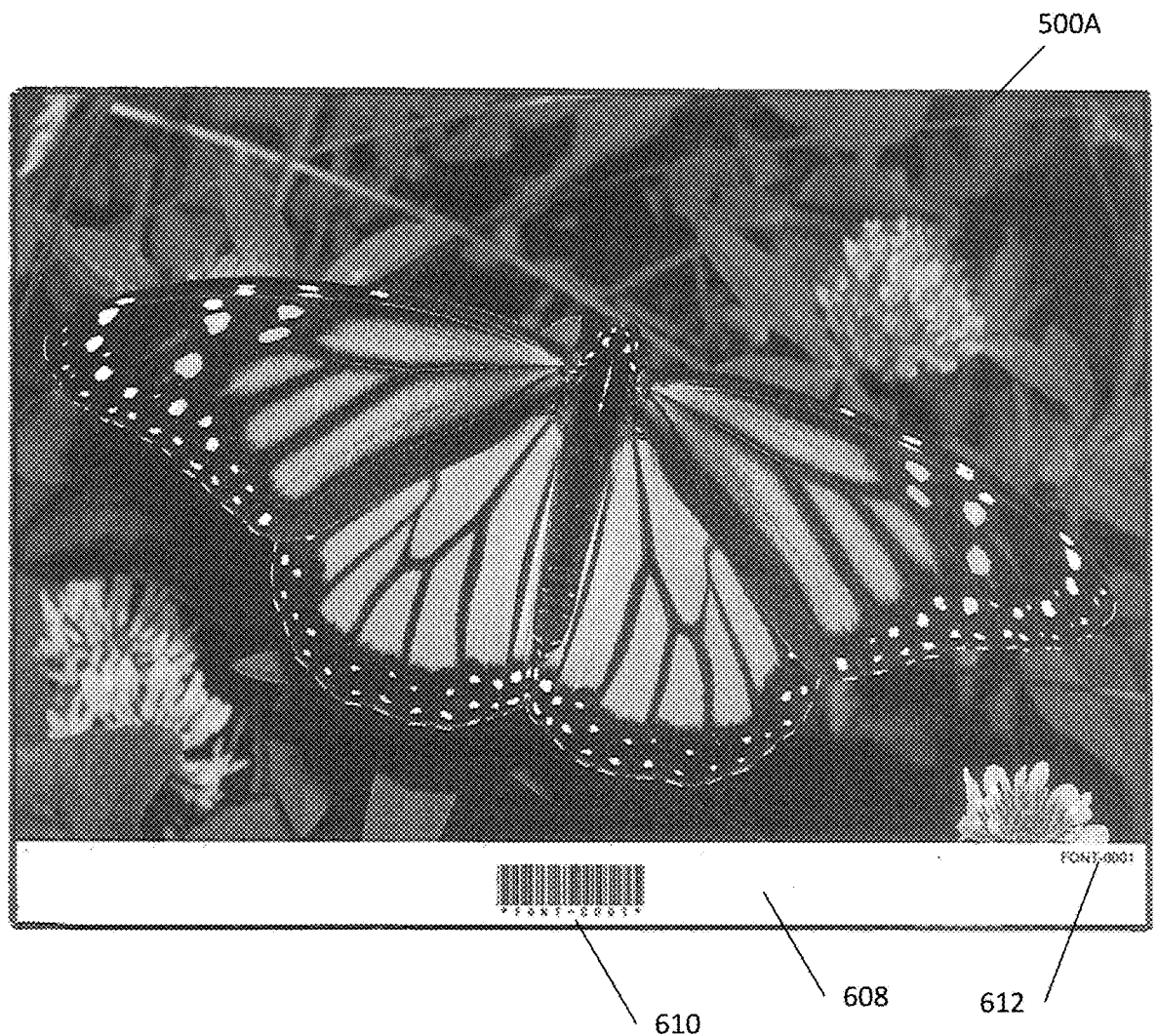
FIG. 6 is a landscape-oriented photograph modified with an added margin for a label, according to an example embodiment.

FIG. 6 illustrates a modified photograph 500A having a margin 608, and a label 610 and text 612 may be included in the added margin 608. The text 612 may have a font size of 38, and the label 610 may have a height of 1.9 inches. Additionally, the modified photograph 500A may have a size of 41.78×30.63".

Figure 7:
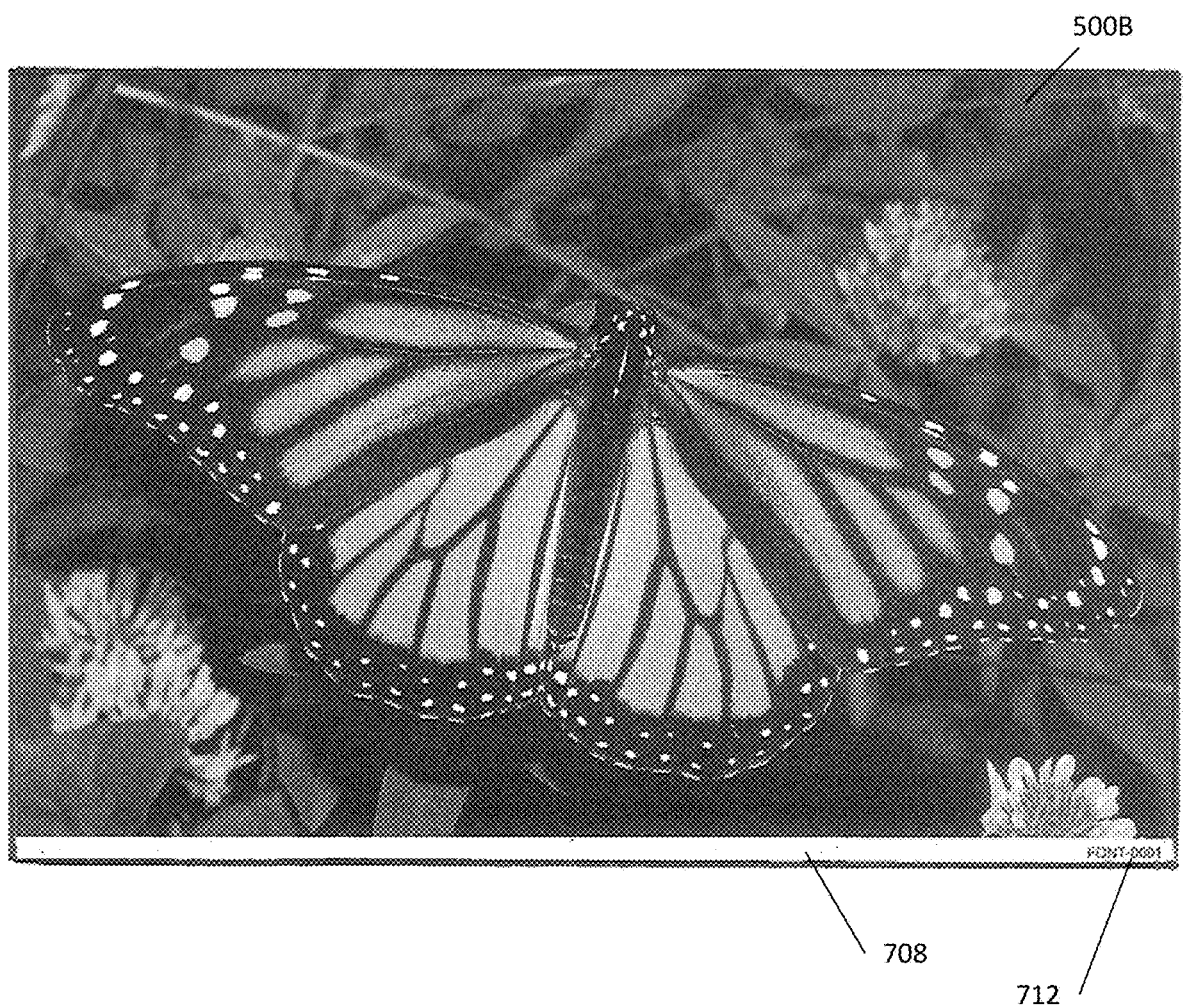
FIG. 7 is a landscape-oriented photograph modified with an added margin for text, according to an example embodiment.

In some embodiments, only text may be added in a newly created margin. For example, FIG. 7 illustrates a modified photograph 500B having a new margin 708 that only includes text 712. Because only text is included, the margin 708 may not be as large as when a label is also included in the margin. If only text is included, the margin height may be determined based on the font size. As described above, the reduction ratio may determine that the font size ought to be 38 point font, which would translate to approximately 0.53 inches. A predetermined number (e.g. 1.2) may be multiplied by the determined font height to determine the margin height so that some white space surrounds the text. For example, 0.53 inches*1.2=0.63 inches. Therefore the margin 708 may have a height of 0.63 inches.

Figure 8:
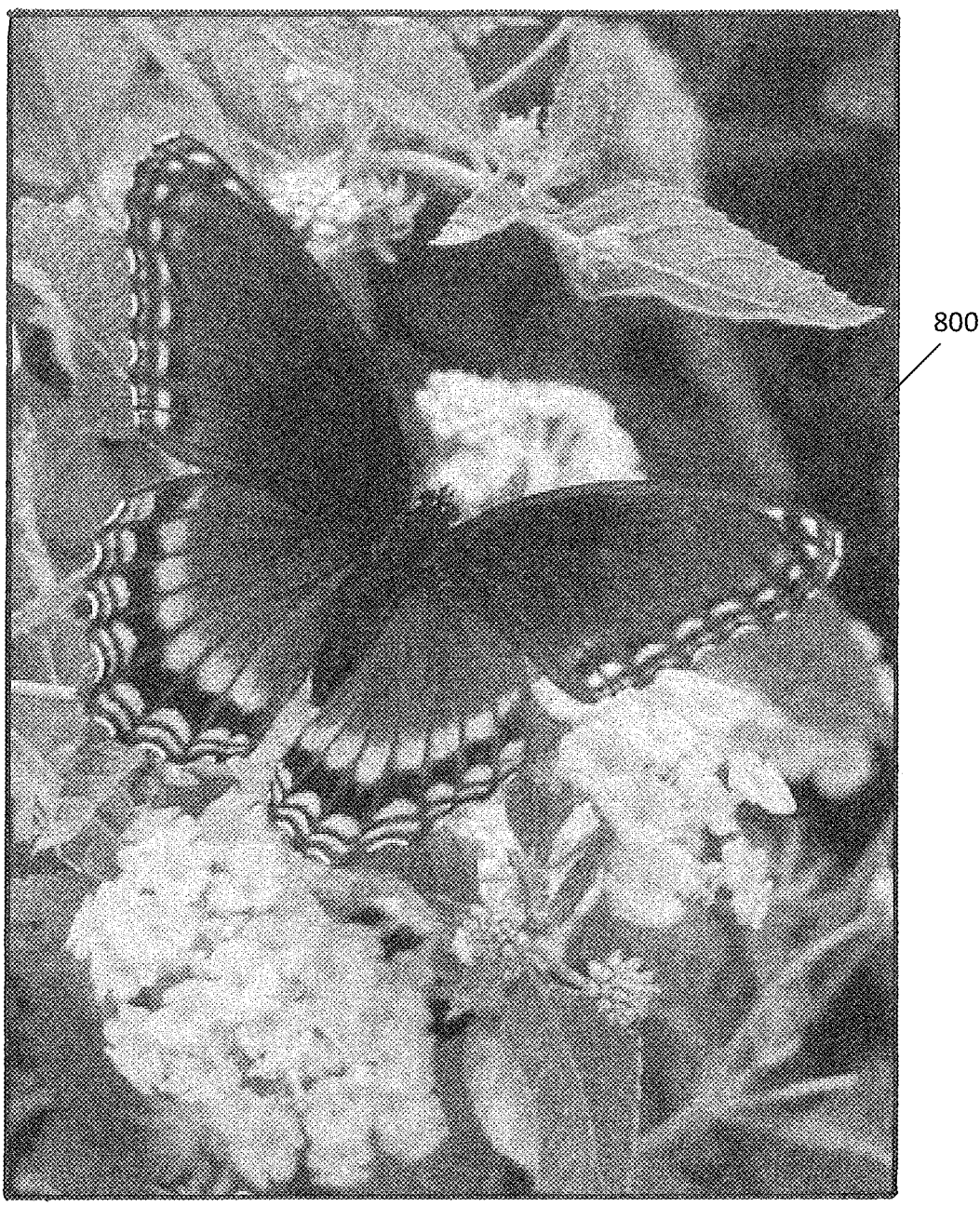
FIG. 8 is a portrait-oriented photograph, according to an example embodiment.

As another example, FIG. 8 illustrates a photograph 800. For example, the size of the photograph 800 may be 5.25"× 6.94". The processor may calculate the aspect ratio of the photograph 800 by dividing the width (5.25") by the height of the photograph (6.94"), and the processor may determine that the aspect ratio is 0.756 (Step 306 in FIG. 3). Using this aspect ratio, the processor may determine that photograph 800 has a portrait orientation because the aspect ratio is less than 1. The processor may also determine a reduction ratio for the photograph 800 by dividing a standard sized document's width (e.g. 8.5" for a portrait-oriented document) by the photograph's 800 width (5.25"). The reduction ratio is therefore 8.5÷5.25=1.524 (Step 402 in FIG. 4).

Using that reduction ratio, the processor may divide a predetermined margin size (e.g. 0.75") by the reduction ratio. The margin size for the photograph 800 may be determined by dividing the predetermined number by the reduction ratio (0.75÷1.524=0.492") (Step 404 in FIG. 4). Therefore, a margin of 0.492" may be added to the photograph 800. The new document size may be 5.25×7.432" in view of the added margin to the height of the photograph 800 (Step 406 in FIG. 4).

Still using that reduction ratio, the processor may divide a predetermined font size (e.g. font size 10) by the reduction ratio. The processor may also divide a predetermined label size (e.g. 0.5") by the reduction ratio. The font size for the photograph 800 is determined by dividing the predetermined number by the reduction ratio (10 points÷1.524=7 points) (Step 408 in FIG. 4). The label size for the photograph 800 may be determined by dividing the predetermined label size by the reduction ratio (0.5÷1.524=0.33") (Step 408 in FIG. 4). Therefore, text with a font size 7 points may be added to the photograph 800 and/or a label having a height of 0.33" may be added to the photograph 800 (Step 410 in FIG. 4).

Figure 9:
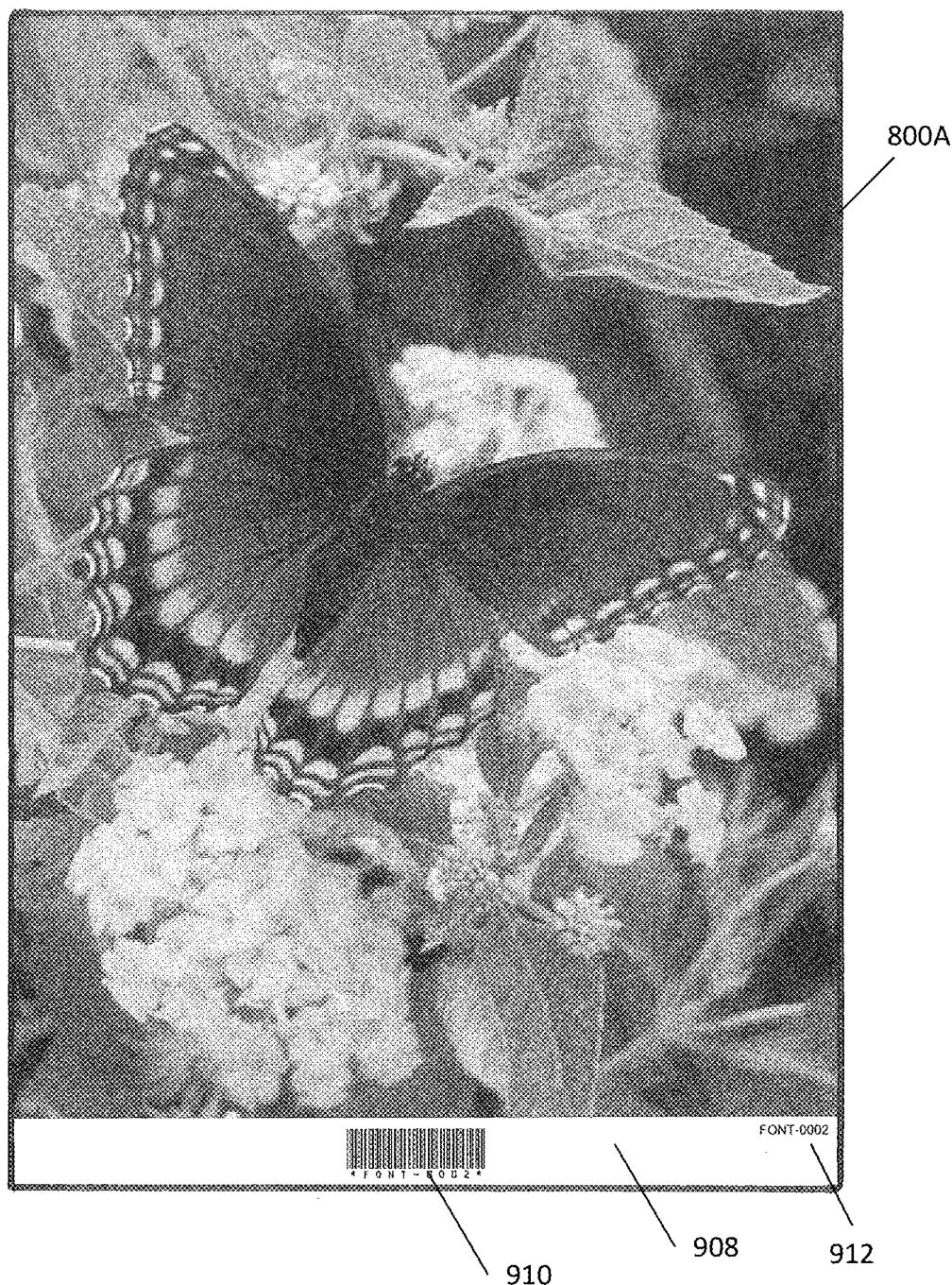
FIG. 9 is a portrait-oriented photograph modified with an added margin for a label, according to an example embodiment.

FIG. 9 illustrates a modified photograph 800A having a margin 908, and a label 910 and text 912 may be included in the added margin 908. The text 912 may have a font size of 7, and the label 910 may have a height of 0.33 inches. Additionally, the modified photograph 800A may have a size of 5.25×7.432".

Figure 10:
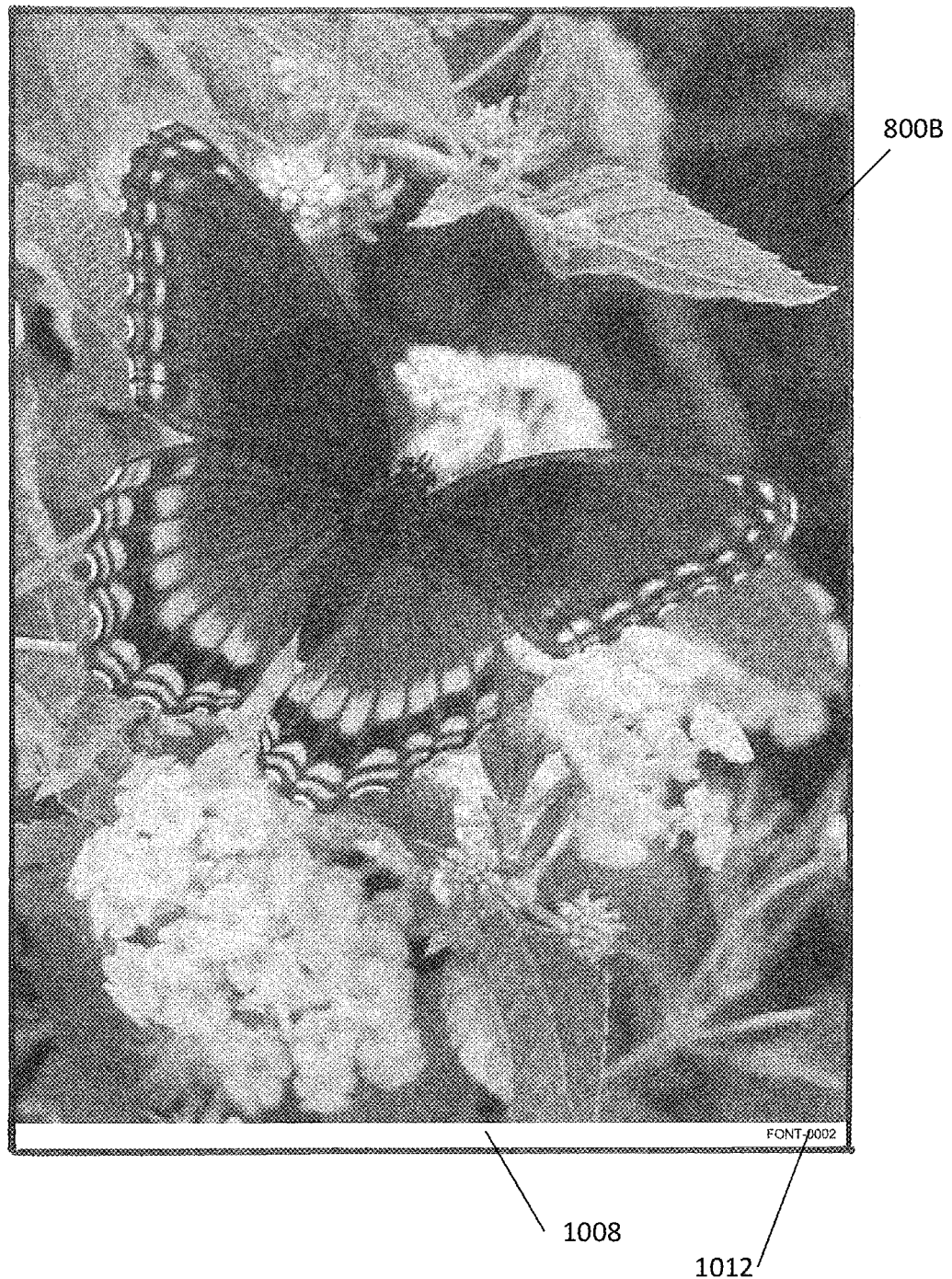
FIG. 10 is a portrait-oriented photograph modified with an added margin for text, according to an example embodiment.

FIG. 10 illustrates a modified photograph 800B having a new margin 1008 that only includes text 1012. The margin 1008 may be sized according to the determined font size for the text 1012.

Figure 11:
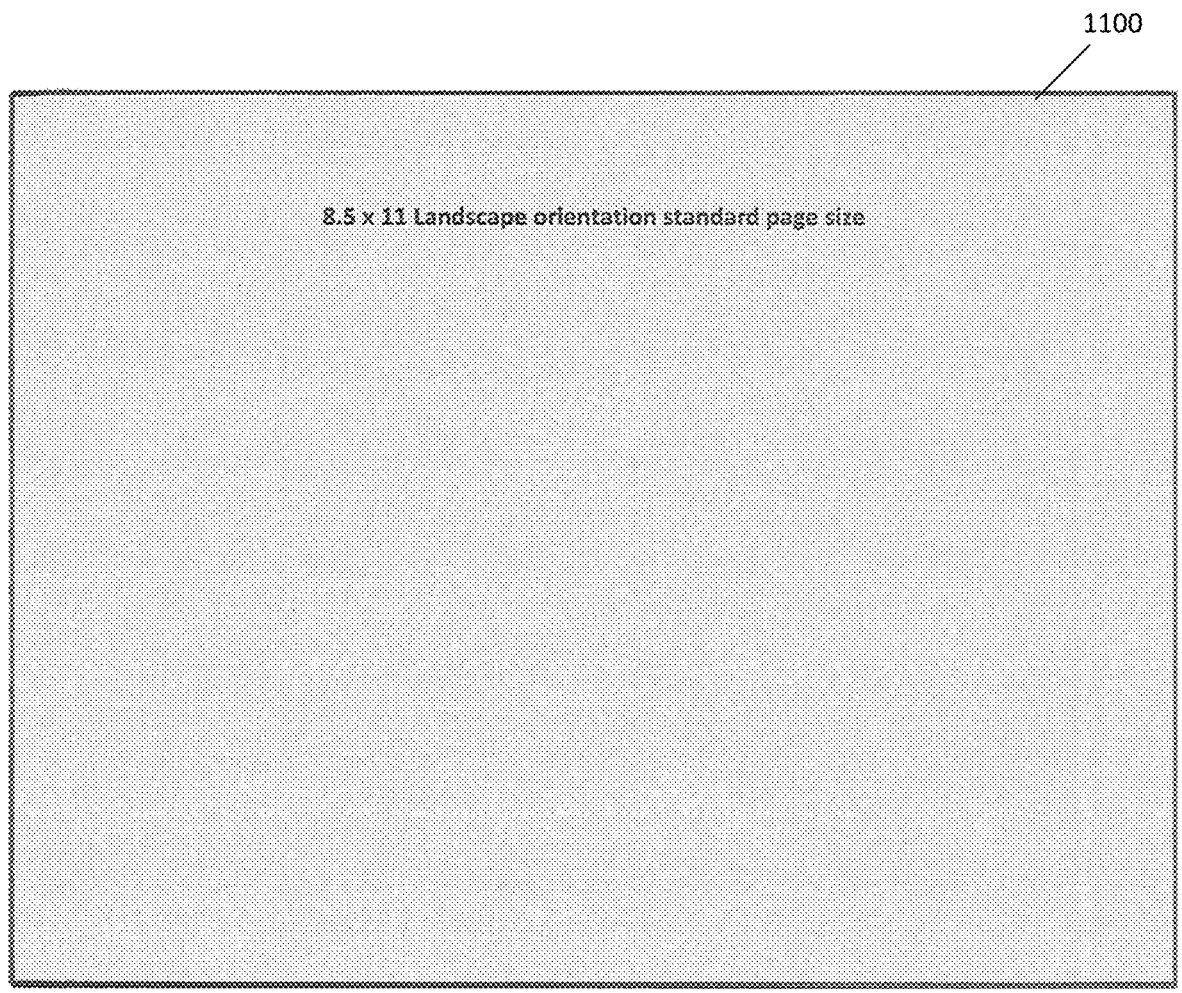
FIG. 11 is a standard-sized, landscape-oriented document, according to an example embodiment.

As a further example, FIG. 11 illustrates a standard sized, landscape-oriented document 1100 (e.g. 8.5×11"). The processor may calculate the aspect ratio of the document 1100 by dividing the width (11") by the height of the document (8.5"), and the processor may determine that the aspect ratio is 1.294 (see Step 306 in FIG. 3). Using this aspect ratio, the processor may determine that this document 1100 has a landscape orientation because the aspect ratio is greater than 1. Because the document is standard size, the processor need not calculate a reduction ratio. Or, if the processor does calculate a reduction ratio, the ratio will equal 1, and a reduction ratio of 1 will have no effect on the predetermined values for the margin sizes, font sizes, or label sizes.

Therefore, the processor may add a margin having the predetermined size (e.g. 0.75"), text having the predetermined font size (e.g. font size 10), and/or a label having the predetermined label size (e.g. 0.5").

Figure 12:
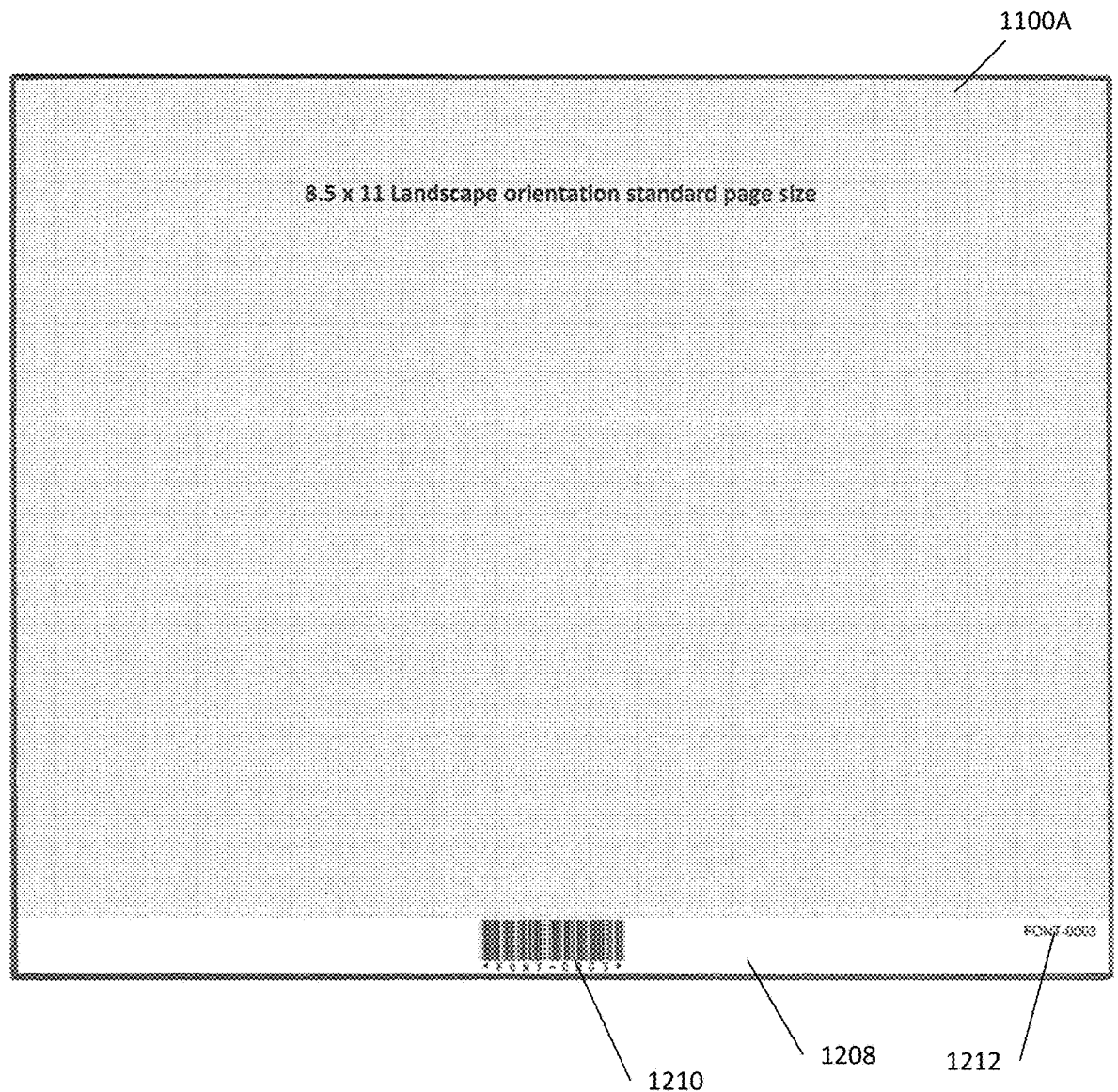
FIG. 12 is a standard-sized, landscape-oriented document modified with an added margin for a label, according to an example embodiment.

FIG. 12 illustrates a modified document 1100A having a margin 1208, and a label 1210 and text 1212 may be included in the added margin 1208. The margin may have a height of 0.75 inches, the text 1212 may have a font size of 10, and the label 1210 may have a height of 0.5 inches. Additionally, the modified document 1100A may have a size of 9.25×11".

Figure 13:
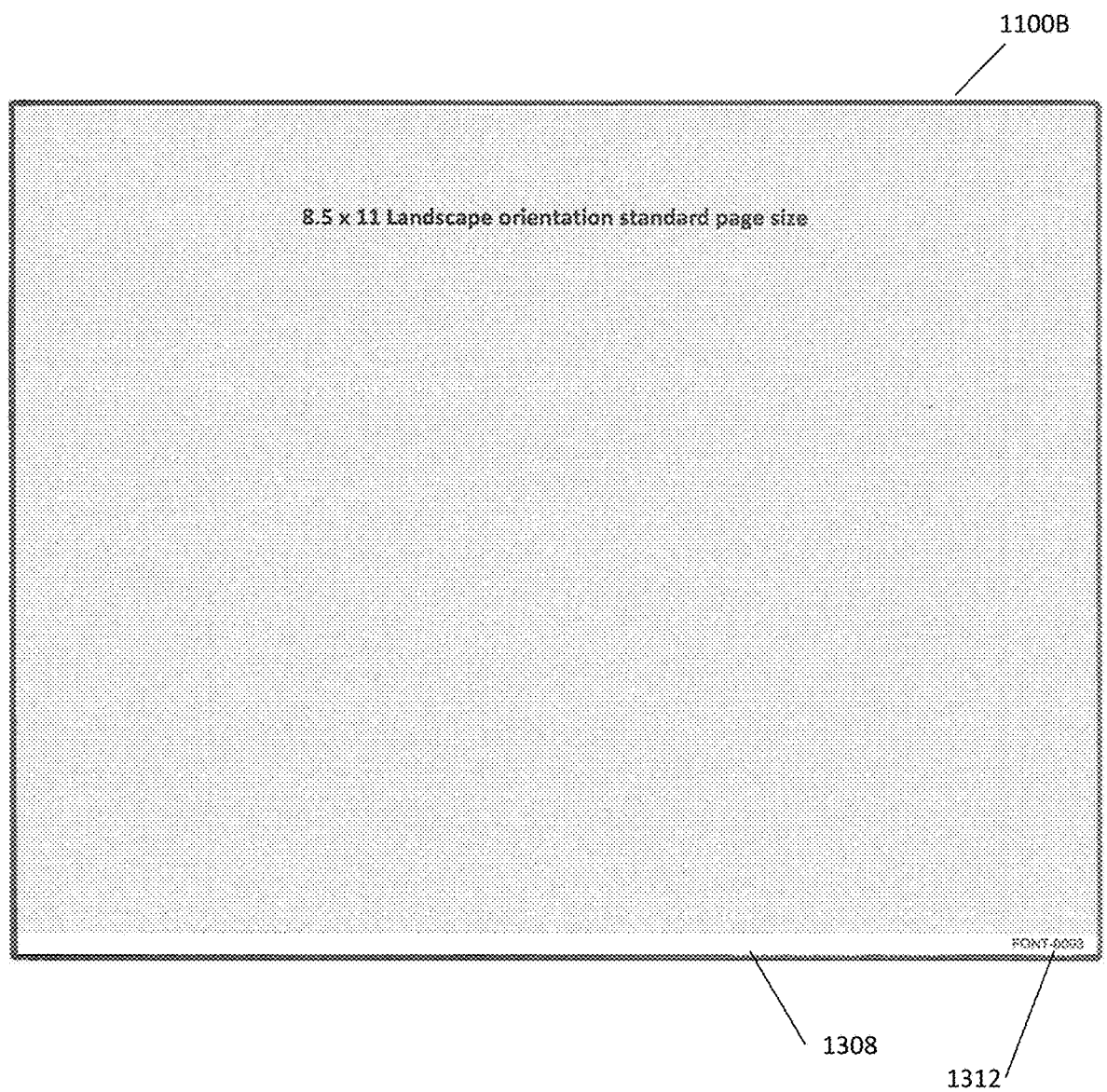
FIG. 13 is a standard-sized, landscape-oriented document modified with an added margin for text, according to an example embodiment.

FIG. 13 illustrates a modified photograph 1100B having a new margin 1308 that only includes text 1312. The margin 1308 may be sized according to the determined font size for the text 1312.

Figure 14:
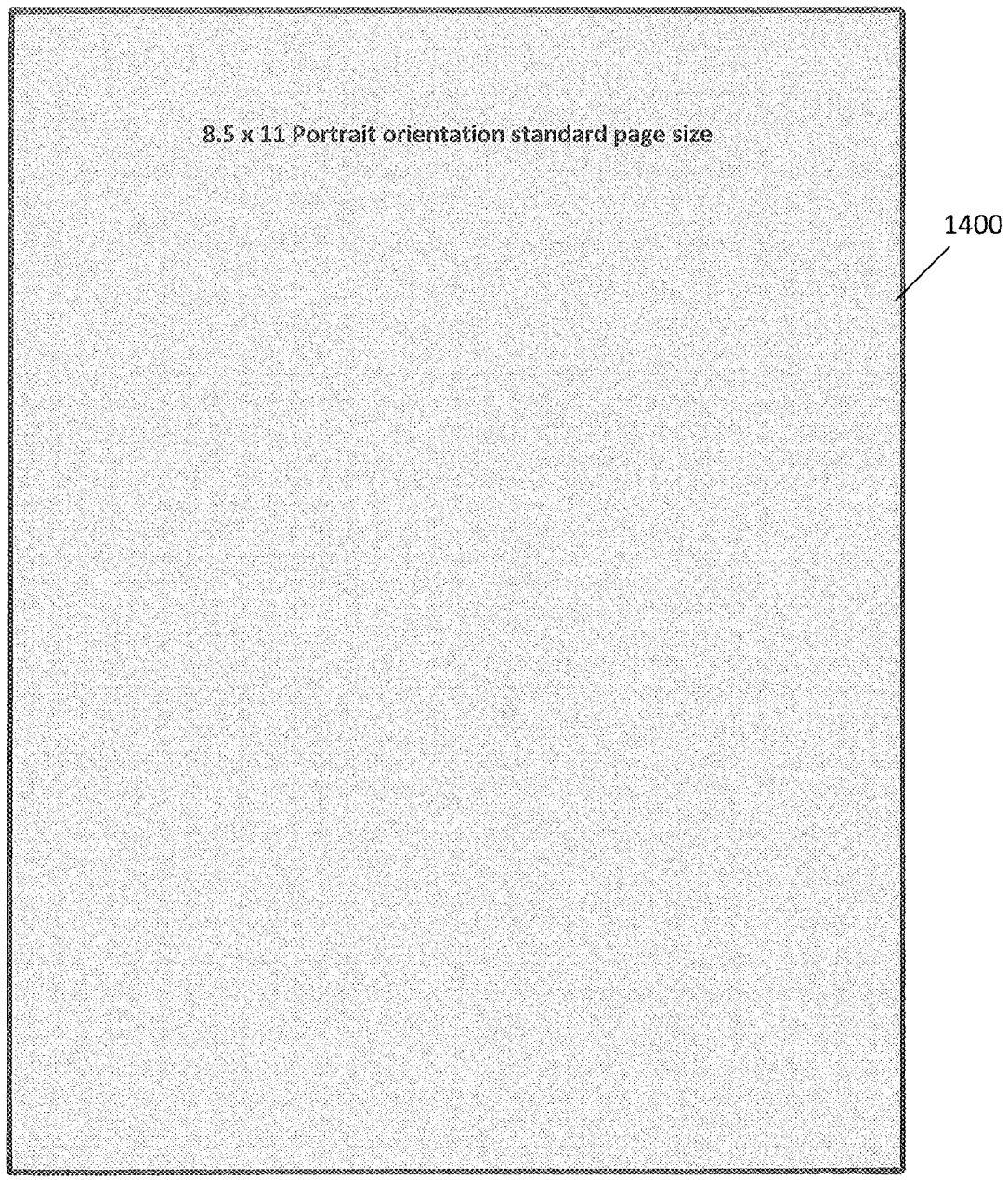
FIG. 14 is a standard-sized, portrait-oriented document, according to an example embodiment.

As yet another example, FIG. 14 illustrates a standard sized portrait-oriented document 1400 (e.g. 11×8.5"). The processor may calculate the aspect ratio of the document 1400 by dividing the width (8.5 inches) by the height of the document (11 inches), and the processor may determine that the aspect ratio is 0.774 (see Step 306 in FIG. 3). Using this aspect ratio, the processor may determine that this document 1400 has a portrait orientation because the aspect ratio is less than 1. Because the document is standard size, the processor need not calculate a reduction ratio. Or, if the processor does calculate a reduction ratio, the ratio will equal 1, and a reduction ratio of 1 will have no effect on the predetermined values for the margin sizes, font sizes, or label sizes.

Therefore, the processor may add a margin having the predetermined size (e.g. 0.75"), text having the predetermined font size (e.g. font size 10), and/or a label having the predetermined label size (e.g. 0.5").

Figure 15:
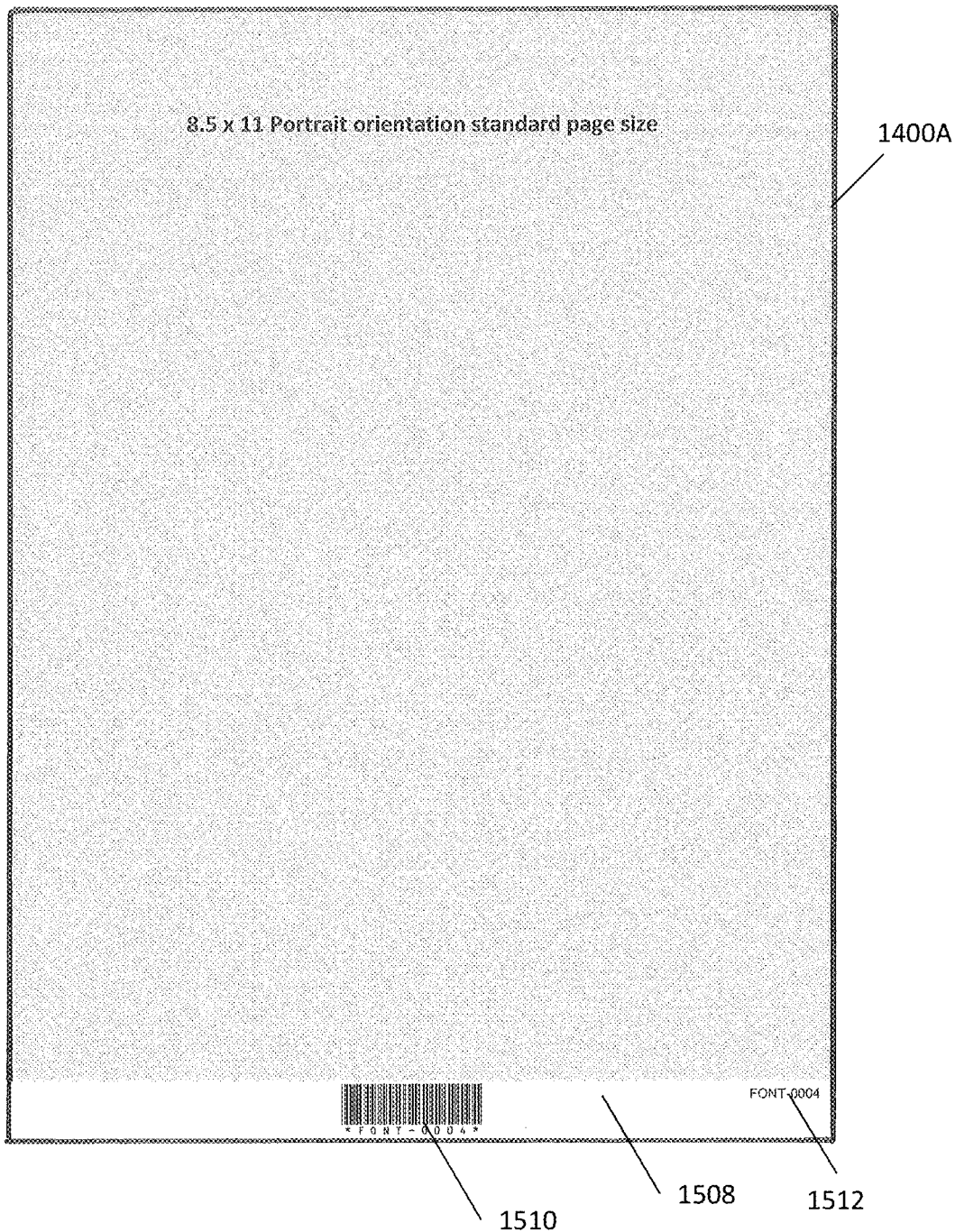
FIG. 15 is a standard-sized, portrait-oriented document modified with an added margin for a label, according to an example embodiment.

FIG. 15 illustrates a modified document 1400A having a margin 1508, and a label 1510 and text 1512 may be included in the added margin 1508. The margin 1508 may have a height of 0.75 inches, the text 1512 may have a font size of 10, and the label 1510 may have a height of 0.5 inches. Additionally, the modified document 1400A may have a size of 8.5×11.75".

Figure 16:
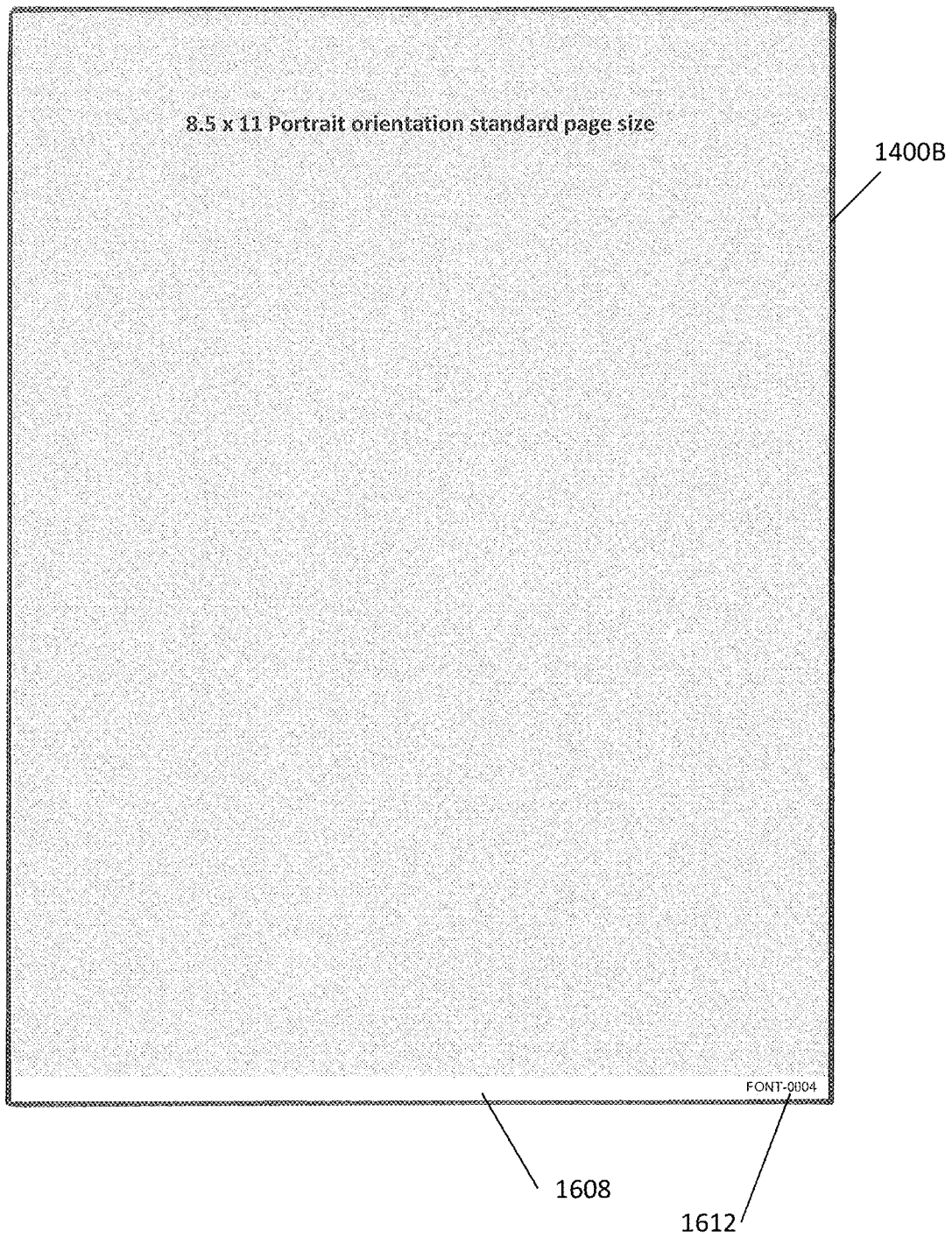
FIG. 16 is a standard-sized, portrait-oriented document modified with an added margin for text, according to an example embodiment.

FIG. 16 illustrates a modified photograph 1400B having a new margin 1608 that only includes text 1612. The margin 1608 may be sized according to the determined font size for the text 1612. The size of the font only margin 1608 may also be predetermined based on the 10 point font.

Figure 17:
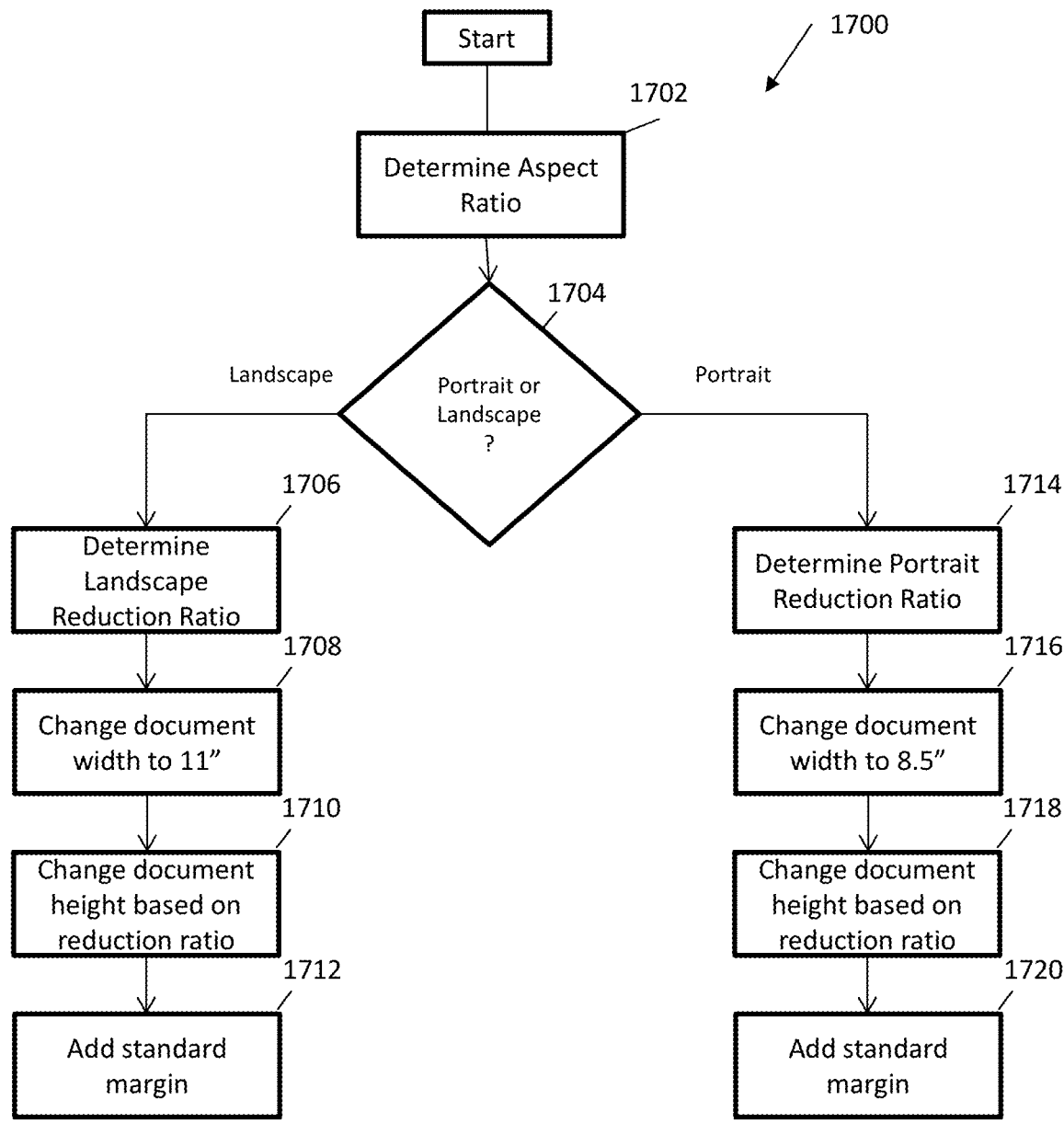
FIG. 17 is a flowchart illustrating a second method for adding a margin and labels to a modified document, according to an example embodiment.

FIG. 17 illustrates a second method 1700 for adding a margin and label to a document. The method 1700 differs from the method 400 in FIG. 4 in that a standard sized margin (e.g. 0.75") may be added to a document, but the document may be resized according to its aspect ratio using standard-sized dimensions (e.g. 8.5×11"). Said differently, the method 400 of FIG. 4 may proportionately size a margin based on the size of the document, whereas the method 1700 may resize the document contents based on standard dimensions. The method 1700 of FIG. 17 may include a predetermined font size and label size for the predetermined margin size.

The method 1700 may begin at step 1702 where the processor may determine the aspect ratio of a document. The processor may determine whether the document has a landscape orientation or a portrait orientation based on the aspect ratio in step 1704. For example, the processor determines whether the document has a landscape orientation or a portrait orientation by determining whether the aspect ratio is greater than or less than 1.

If the document has a landscape orientation, the processor determines a landscape reduction ratio of the document in step 1706. The processor may determine the landscape reduction ratio by dividing a standard landscape width (e.g. 11 inches) by the document's width in step 1708. After determining the reduction ratio, the processor may resize the document so that it has a standard width (e.g. 11 inches) in step 1710. The processor may also resize the document's height such that the aspect ratio is maintained, which may involve multiplying the document's width by the reduction ratio or using other resizing techniques known in the art. After resizing the document, the processor may add a predetermined margin size (e.g. 0.75 inches) to the document in step 1712. If the document is already a standard sized document (e.g. 11×8.5"), then the processor may skip steps 1706-1710.

Using FIG. 5 again as an example, steps 1702-1712 may include the following calculations. First, the processor may determine that the aspect ratio of the photograph 500 is 1.504 (step 1702); therefore, the processor can determine that the photograph 500 has a landscape orientation (step 1704). Calculating the reduction ratio comprises dividing the standard landscape width (11 inches) by the photograph's 500 actual width (41.78 inches), which results in a reduction ratio of 0.263 (step 1706). The reduction ration can be multiplied by the photograph's 500 dimensions to resize the document to 11×7.314" (steps 1708 and 1710). The photograph's 500 height is slightly smaller than the standard height because the photograph 500 does not have the same aspect ratio as the standard size. Finally, a margin is added to the photograph 500 according to the predetermined margin size. The margin may depend on whether a label is being added or just text. A first predetermined margin size for a margin having a label may be 0.75 inches (see FIG. 6), and a second predetermined margin size for a margin having only text may be 0.19 inches (see FIG. 7).

Referring again to FIG. 17, if the document has a portrait orientation, the processor may determine a portrait reduction ratio of the document in step 1714. The processor may determine the portrait reduction ratio by dividing a standard portrait width (e.g. 8.5 inches) by the document's width in step 1716. After determining the reduction ratio, the processor may resize the document so that it has a standard width (e.g. 8.5 inches) in step 1718. The processor may also resize the document's height such that the aspect ratio is maintained, which may involve multiplying the document's width by the reduction ratio or using other resizing techniques known in the art. After resizing the document, the processor may add a predetermined margin size (e.g. 0.75 inches) to the document in step 1720. If the document is already a standard sized document (e.g. 8.5×11"), then the processor may skip steps 1714-1718.

Using FIG. 8 again as an example, steps 1702-1704 and 1714-1720 may include the following calculations. First, the processor may determine that the aspect ratio of the photograph 800 is 0.756 (step 1702); therefore, the processor can determine that the photograph 800 has a portrait orientation (step 1704). Calculating the reduction ratio comprises dividing the standard landscape width (8.5 inches) by the photograph's 800 actual width (5.25 inches), which results in a reduction ratio of 1.524 (step 1714). The reduction ration can be multiplied by the photograph's 800 dimensions to resize the document to 8.5×11.23" (steps 1716 and 1718). The photograph's 800 height is slightly taller than the standard height because the photograph 800 does not have the same aspect ratio as the standard size, but this protects against unnecessary white space around the document. Finally, a margin is added to the photograph 800 according to the predetermined margin size. The predetermined margin size may depend on whether a label is being added or just text. A first predetermined margin size for a margin having a label may be 0.75 inches (see FIG. 9), and a second predetermined margin size for a margin having only text may be 0.19 inches (see FIG. 10).

Figure 18:
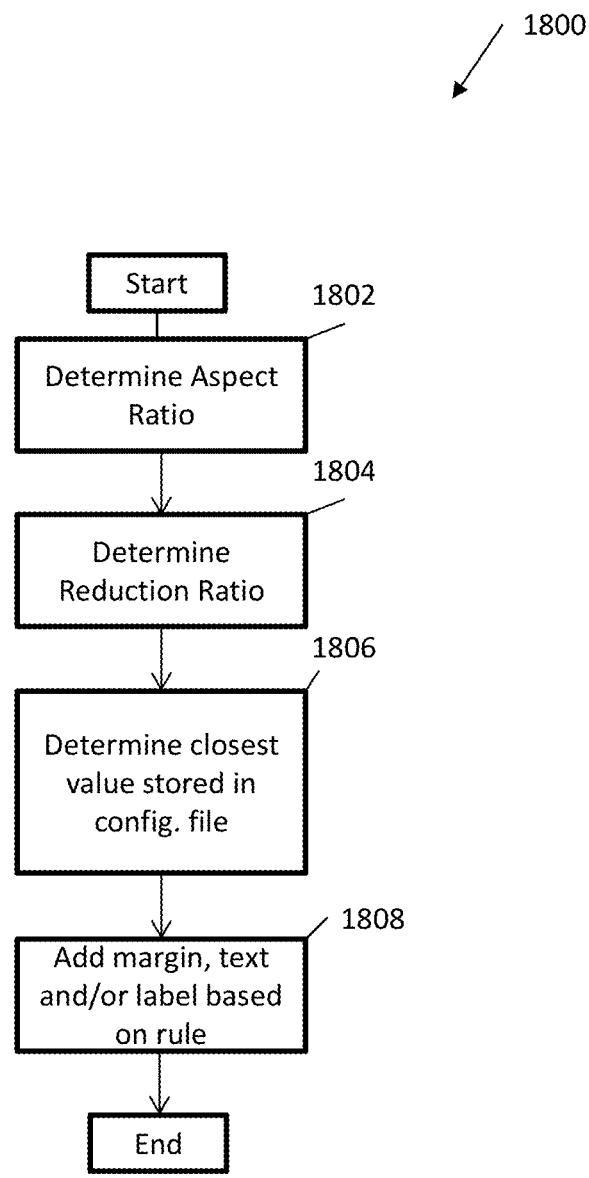
FIG. 18 is a flowchart illustrating a third method for adding a margin and labels to a modified document, according to an example embodiment.

FIG. 18 illustrates a third method 1800 for adding a margin and label to a document. The method 1800 may be similar to the method 400 in FIG. 4 in that the method 1800 proportionately sizes a margin based on the size of the document. However, the method 1800 of FIG. 18 may references a set of rules in a configuration file rather than performing mathematical calculations for resizing a predetermined margin size.

The method 1800 may begin at step 1802 where the processor may determine the aspect ratio of a document. Based on the aspect ratio, the processor may determine a reduction ratio for the document in step 1804. For example, the processor may divide the number 11 by the document's width to determine the reduction ratio for a landscape document, or the processor may divide the number 8.5 by the document's width to determine the reduction ratio for a portrait document.

Using the determined reduction ratio, the processor may reference a configuration file stored in a non-transitory computer-readable medium in step 1806. Finding a matching reduction ratio in the configuration file may comprise rounding the determined reduction ratio up or down or finding the closest value in the configuration file. The configuration file may store margin size values, font size values, label positions, and label sizes. Therefore, the configuration file may provide the processor with the values needed to create the margin, text, and/or label. The processor may use these stored values in the configuration file to create the margin, the text, and the label sized according to the rules in the configuration file in step 1808.

An example configuration file is listed below:

```
<batesSettings>
    <fontThresholds>
        <add reductionRatio="4" fontSize="3" barCodeYPosition="5" barcodeMarginInInches=".3"/>
        <add reductionRatio="3" fontSize="4" barCodeYPosition="7" barcodeMarginInInches=".4"/>
        <add reductionRatio="2" fontSize="5" barCodeYPosition="9" barcodeMarginInInches=".5"/>
        <add reductionRatio="1.5" fontSize="7" barCodeYPosition="10" barcodeMarginInInches=".6"/>
        <add reductionRatio="1.2" fontSize="9" barCodeYPosition="15" barcodeMarginInInches=".63"/>
        <add reductionRatio=".90" fontSize="10" barCodeYPosition="15" barcodeMarginInInches=".65"/>
        <add reductionRatio=".75" fontSize="12" barCodeYPosition="15" barcodeMarginInInches=".75"/>
        <add reductionRatio=".6" fontSize="15" barCodeYPosition="15" barcodeMarginInInches=".85"/>
        <add reductionRatio=".4" fontSize="21" barCodeYPosition="25" barcodeMarginInInches="1.35"/>
        <add reductionRatio=".3" fontSize="35" barCodeYPosition="35" barcodeMarginInInches="2.75"/>
    </fontThresholds>
</batesSettings>
```

Using FIG. 5 again as an example, steps 1802-1808 may include the following calculations. First, the processor may determine that the aspect ratio of the photograph 500 is 1.504 (step 1802); therefore, the processor can determine that the photograph 500 has a landscape orientation. Calculating the reduction ratio may comprise dividing the standard landscape width (11 inches) by the photograph's 500 actual width (41.78 inches), which results in a reduction ratio of 0.263 (step 1804). The processor can reference the configuration file listed above and may find that the closest reduction value to 0.263 is 0.3 (step 1806). The configuration file may inform the processor that the margin size should be 2.75 inches, the font size should be 35, and the bar code position should be 35 points above the bottom of the page (i.e. the barcode's position on the page, and the processor may add the margin, barcode, and text accordingly (step 1808). The photograph's 500 new dimensions may be 41.78×30.53 inches.

Using FIG. 8 again as another example, steps 1802-1808 may include the following calculations. First, the processor may determine that the aspect ratio of the photograph 800 is 0.756 (step 1802); therefore, the processor can determine that the photograph 800 has a portrait orientation. Calculating the reduction ratio may comprise dividing the standard portrait width (8.5 inches) by the photograph's 800 actual width (5.25 inches), which results in a reduction ratio of 1.524 (step 1804). The processor can reference the configuration file listed above and may find that the closest reduction value to 1.524 is 1.5 (step 1806). The configuration file may inform the processor that the margin size should be 0.6 inches, the font size should be 7, and the bar code position should be 10 points above the bottom of the page, and the processor may add the margin, barcode, and text accordingly (step 1808). The photograph's 800 new dimensions may be 5.25×7.54 inches.

The configuration file can work with standard sized documents as well. Using FIG. 11 again as an example, steps 1802-1808 may include the following calculations. First, the processor may determine that the aspect ratio of the document 1100 is 1.294 (step 1802); therefore, the processor can determine that the document 1100 has a landscape orientation. Calculating the reduction ratio comprises dividing the standard landscape width (11 inches) by the document's 1100 actual width (11 inches), which results in a reduction ratio of 1 (step 1804). The processor can reference the configuration file listed above and find that the closest reduction value to 1 is 0.9 (step 1806). The configuration file informs the processor that the margin size should be 0.64 inches, the font size should be 10, and the bar code position should be 15 points above the bottom of the page, and the processor adds the margin, barcode, and text accordingly (step 1808). The document's 1100 new dimensions may be 11×9.15 inches.

In any of the above described exemplary embodiments, the processor may create a separate document file for the document having the added margin and label. The processor may store the original document without any modifications with the altered document having the margin and label. Even though the described methods may not alter document contents, storing a modified copy of the document provides added protection that no important content would be lost. This may be especially important if the Bates numbering is used in litigation.

The example embodiments described above may alter a document's overall aspect ratio, but the exemplary embodiments do not generally alter the document contents' aspect ratio. The addition of the margin may change a document from being printed on a standard sized page to no longer fitting on a standard sized page. Nevertheless, the exemplary embodiments can function with an operating system's or printer driver's "Print-to-fit" function to assure that both the document contents and the added label are printed on a standard size page or any printable page size (e.g. A4, etc.). This print-to-fit function compliments the example embodiments described herein because the print-to-fit function ensures that any document created by the exemplary systems and methods described herein will always print on standard (or other) printer paper. The print-to-fit function allows the exemplary embodiments described herein to create documents of any size without worrying about whether the newly created documents can be printed on standard paper by conventional printers.

Figure 19:
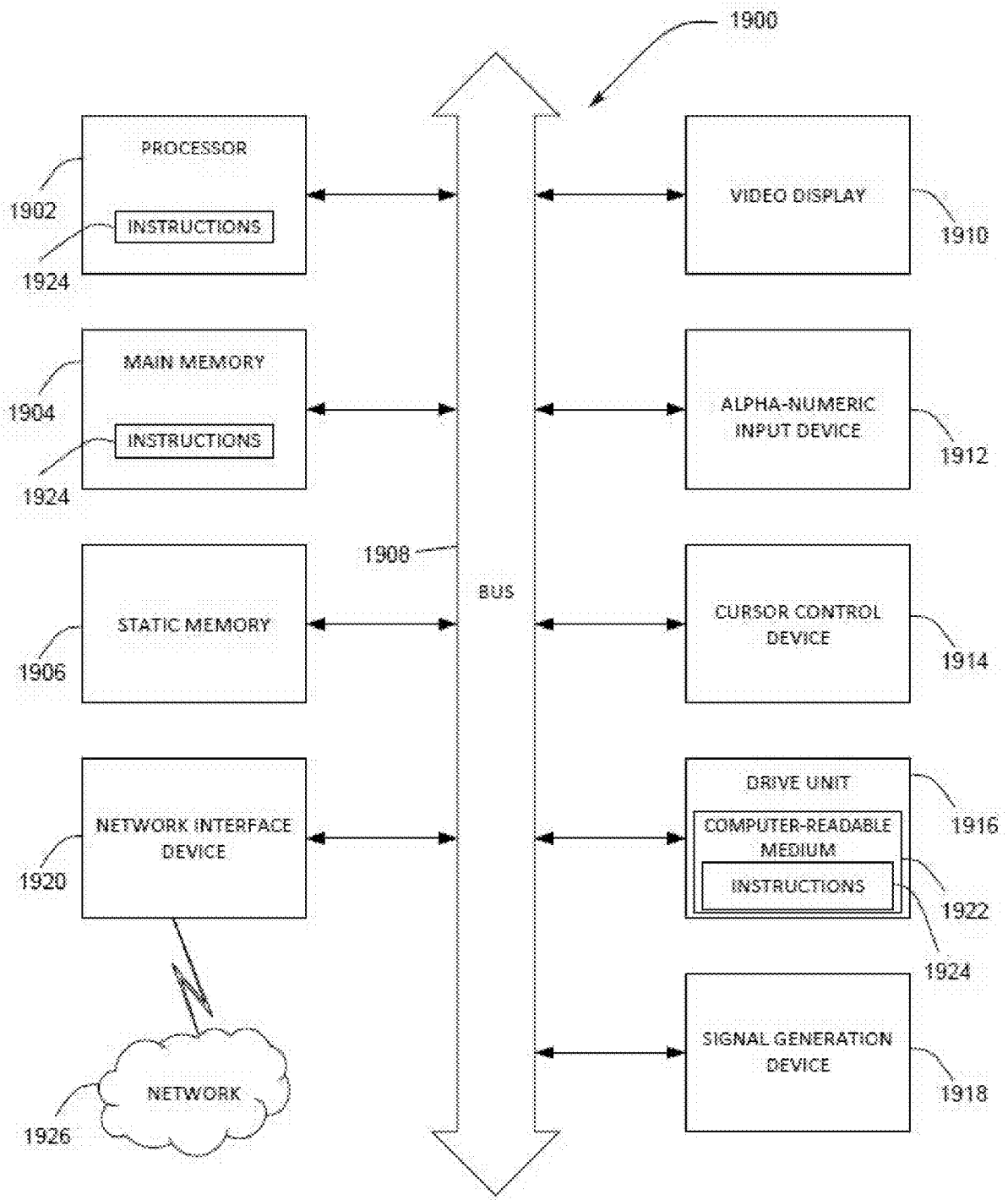
FIG. 19 is a block diagram of a machine in the example form of a computer system within which a set of instructions for causing the machine to perform any one or more of the methodologies discussed herein may be executed or stored.

FIG. 19 shows a block diagram of a machine in the example form of a computer system 1900 within which a set of instructions may be executed causing the machine to perform any one or more of the methods, processes, operations, or methodologies discussed herein. The processor described above may include the functionality of the one or more computer systems 1900.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU) a graphics processing unit (GPU) or both), a main memory 1904 and a static memory 1906, which communicate with each other via a bus 1908. The processor 1902 may include a single discrete electronic processing element or a multiple electronic processing elements that can execute the processes, flows, and methods described herein.

The computer system 1900 further includes a video display unit 1910 (e.g., a liquid crystal display (LCD) or a cathode ray tube (CRT)). The computer system 1900 also includes an alphanumeric input device 1912 (e.g., a keyboard), a cursor control device 1914 (e.g., a mouse), a drive unit 1916, a signal generation device 1918 (e.g., a speaker) and a network interface device 1920.

The drive unit 1916 includes a computer-readable medium 1922 on which is stored one or more sets of instructions (e.g., software 1924) embodying any one or more of the methodologies or functions described herein. The software 1924 may also reside, completely or at least partially, within the main memory 1904 and/or within the processor 1912 during execution thereof by the computer system 1900, the main memory 1904 and the processor 1912, also constituting computer-readable media.

The software 1924 may further be transmitted or received over a network 1926 via the network interface device 1920.

While the computer-readable medium 1922 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present disclosure. The term "computer-readable medium" shall accordingly be taken to include, but not be limited to, solid-state memories, and optical media, and magnetic media. In some embodiments, the computer-readable medium is a non-transitory computer-readable medium.

In one embodiment, a method comprises receiving, by a processor, a document having document contents, wherein the document comprises a first aspect ratio and the document contents comprise the first aspect ratio; creating, by the processor, a margin to the document by increasing a height or a width of the document, thereby giving the document a second aspect ratio; and inserting, by the processor, a label within the margin, wherein the document contents maintain the first aspect ratio after the margin is created In another embodiment, a system comprises a programmable processor; and executable control software stored on a non-transitory computer readable medium, wherein the processor is configured to receive a document having document contents, create a margin to the document by increasing a height or a width of the document, and insert a label within the margin, wherein the document comprises a first aspect ratio and the document contents comprise the first aspect ratio, wherein creating the margin to the document gives the document a second aspect ratio, and wherein the document contents maintain the first aspect ratio after the margin is create.

In yet another embodiment, a non-transitory machine-readable medium compries instructions, which when executed by one or more processors, cause the one or more processors to perform the following operations: receive a document having document contents, wherein the document comprises a first aspect ratio and the document contents comprise the first aspect ratio; create a margin to the document by increasing a height or a width of the document, thereby giving the document a second aspect ratio; and insert a label within the margin, wherein the document contents maintain the first aspect ratio after the margin is created.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

Thus, methods and systems for labeling documents have been described. Although embodiments of the present disclosure have been described with reference to specific example embodiments, it will be evident that various modifications and changes may be made to these embodiments without departing from the broader spirit and scope of the embodiments of the present disclosure. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A method comprising:
   receiving, by a processor, one or more input documents comprising a plurality of pages, each page of the plurality of pages having an original document contents, wherein the original document contents comprises a first height dimension and a first width dimension that define a first aspect ratio;
   performing, by the processor, a modification of each of the plurality of pages of the one or more input documents, comprising the steps of:
      determining, by the processor, the first height dimension, the first width dimension, the first aspect ratio, and an orientation of the original document contents by measuring an image or a data structure of the document contents in pixels;
      adding, by the processor, a new extended region to one side of the document contents outside of the original document contents such that a new combined document contents is formed, where the new extended region added does not alter the first aspect ratio of the original document contents;
      creating, by the processor, a modified output page of a non-standard printing size comprising the new combined document contents, such that a second height dimension and a second width dimension of the combined document contents defines a second aspect ratio different than the first aspect ratio;
      identifying, by the processor, boundaries of the new extended region; and
      inserting, by the processor, a label within the boundaries of the new extended region; and
   combining each of the modified output pages of the one or more input documents into one or more output documents, which are exported for use.

2. The method of claim 1, further comprising determining, by the processor, a greater of the first width dimension and the first height dimension.

3. The method of claim 2, further comprising determining, by the processor, a sizing ratio based at least in part on the determined greater of the first width dimension and the first height dimension.

4. The method of claim 1, wherein the label is text, a barcode and text, or a barcode.

5. The method of claim 1, further comprising:
   identifying, by the processor, the first overall width dimension and the first overall height dimension prior to creating the output page.

6. The method of claim 5, wherein the new extended region comprises a predetermined dimension, and wherein the output page is formed by increasing either the first height dimension or the first width dimension by the predetermined dimension while maintaining the first aspect ratio with respect to the original document contents.

7. The method of claim 6, wherein adding the new extended region further comprises:
increasing, by the processor, the first height dimension or the first width dimension of the page by the predetermined dimension.

8. The method of claim 1, wherein the label comprises predetermined label dimensions.

9. The method of claim 5, further comprising:
determining, by the processor, whether the page comprises a landscape orientation or a portrait orientation based on the first width dimension and the first height dimension or the first aspect ratio.

10. The method of claim 9, further comprising:
calculating, by the processor, a sizing ratio by:
dividing a standard landscape width dimension by the first width dimension when the document comprises the landscape orientation or by dividing a standard portrait width dimension by the first width dimension when the document comprises the portrait orientation or
dividing a standard landscape height dimension by the first height dimension when the document comprised the landscape orientation or by dividing a standard portrait height dimension by the first height dimension when the document comprises the portrait orientation.

11. The method of claim 3, wherein adding the new extended region further comprises:
multiplying the first width dimension by the sizing ratio or the first height dimension by the sizing ratio to identify a predetermined dimension; and
adding, by the processor, the new extended region to the page by increasing either the first height dimension or the first width dimension of the page by the predetermined dimension while maintaining the first aspect ratio with respect to the document contents.

12. The method of claim 3, wherein adding the new extended region further comprises:
calculating, by the processor, a region dimension by multiplying a predetermined region size by the sizing ratio; and
adding, by the processor, the new extended region to the page by increasing either the first height dimension or the first width dimension of the page by the region dimension while maintaining the first aspect ratio with respect to the original document contents.

13. The method of claim 3, wherein inserting the label into the new extended region further comprises:
calculating, by the processor, a font size by multiplying a predetermined font size by the sizing ratio; and
inserting, by the processor, text having the calculated font size into the new extended region.

14. The method of claim 3, wherein inserting the label into the new extended region further comprises:
calculating, by the processor, label dimensions by multiplying a predetermined label dimensions by the sizing ratio; and
inserting, by the processor, the label having the calculated label dimensions into the new extended region.

15. The method of claim 3, wherein creating the new extended region further comprises:

referencing, by the processor, a configuration file;
finding, by the processor, an entry in the configuration file that substantially matches the sizing ratio;
receiving, by the processor, a region dimension from a region definition rule in the entry that substantially matches the sizing ratio; and
adding, by the processor, the new extended region to the page by increasing either the first height dimension or the first width dimension of the page by the region dimension from the region definition rule while maintaining the first aspect ratio with respect to the original document contents.

16. The method of claim 3, wherein inserting the label into the new extended region further comprises:
receiving, by the processor, a font size from a font definition rule in the entry that substantially matches the sizing ratio; and
inserting, by the processor, text having the font size into the new extended region.

17. The method of claim 3, wherein inserting the label into the new extended region further comprises:
receiving, by the processor, label dimensions from a label definition rule in the entry that substantially matches the sizing ratio; and
inserting, by the processor, the label having the label dimensions into the new extended region.

18. The method of claim 1, wherein the first height dimension and first width dimension can additionally be determined by consulting a metadata included in the document.

19. The method of claim 1, further comprising:
receiving, by a processor, a plurality of input documents;
creating, by the processor, the new extended region to each page of each input document; and
inserting, by the processor, the label within the new extended region of each page of each input document.

20. The method of claim 1, wherein the output page maintains the first height dimension, the first width dimension, and the first aspect ratio, and wherein a position of the original document contents remains substantially unchanged in respect to three of the edges of the page while the new extended region is being added.

21. A system comprising:
a programmable processor; and
executable control software stored on a non-transitory computer readable medium,
wherein the processor is configured to:
receive one or more input documents comprising a plurality of pages, each page of the plurality of pages having an original document contents comprising a first height dimension and a first width dimension that define a first aspect ratio;
determine, for each of the plurality of pages, the first height dimension, the first width dimension, the first aspect ratio, and an orientation of the original document contents by measuring an image or a data structure of the document contents in pixels;
create an output page of a non-standard printing size for each of the plurality of pages by adding a new extended region to one side of each page outside of the document contents, such that the output page comprises a new combined document contents with a second height dimension or a second width dimension;
insert a label within the new extended region; and
combine each of the output pages into one or more output documents, which are exported for use; and wherein the output page is formed by changing either the first height dimension or the first width dimension depending on an orientation of the page while maintaining the first aspect ratio with respect to the document contents, wherein the original document contents comprise the first aspect ratio, wherein the second width dimension and the second height dimension of the output page comprise a second aspect ratio that is different than the first aspect ratio, wherein, after the new extended region is created, the original document contents are contained within a region of the output page that comprises the first aspect ratio and is outside the new extended region.

22. A non-transitory machine-readable medium comprising instructions, which when executed by one or more processors, cause the one or more processors to perform the following operations:

receive one or more input documents comprising a plurality of pages, each page of the plurality of pages having an original document contents comprising a first height dimension and a first width dimension that define a first aspect ratio;

determine, for each of the plurality of pages, the first height dimension, the first width dimension, the first aspect ratio, and an orientation of the original document contents by measuring an image or a data structure of the document contents in pixels;

create an output page of a non-standard printing size for each of the plurality of pages by adding a new extended region to one side of each page outside of the document contents, such that the output page comprises a new combined document contents with a second height dimension or a second width dimension;

insert a label within the new extended region; and combine each of the output pages into one or more output documents, which are exported for use.

23. A method comprising:

receiving, by a processor, one or more input documents comprising a plurality of pages, each page of the plurality of pages having an original document contents, wherein the original document contents comprises a first height dimension and a first width dimension that define a first aspect ratio;

performing, by the processor, a modification of each of the plurality of pages of the one or more input documents, comprising the steps of:

determining, by the processor, a first dimension of the original document contents by measuring an image or a data structure of the original document contents in pixels;

calculating, by the processor, a sizing ratio by dividing a predetermined dimension associated with a standard size document by the first dimension of the original document contents;

calculating, by the processor, a font size by multiplying a predetermined font size associated with the standard size document by the sizing ratio;

creating an output page of a non-standard printing size by adding a new extended region to the page while maintaining the first aspect ratio with respect to the original document contents, such that after the new extended region is added, the original document contents are contained within a subregion of the output page that comprises the first aspect ratio and is outside the new extended region; and inserting, by the processor, a textual label having the font size into the new extended region, wherein the output page is formed by changing either a first height dimension or a first width dimension depending on an orientation of the page while maintaining the first aspect ratio with respect to the original document contents;

combining each of the modified output pages of the one or more input documents into one or more output documents, which are exported for use.

24. The method of claim 23, wherein the predetermined dimension is selected based on whether the page comprises a landscape orientation or a portrait orientation.

25. The method of claim 24, wherein the predetermined dimension is 11 when the input document comprises the landscape orientation, and wherein the predetermined dimension is 8.5 when the input document comprises the portrait orientation.

26. The method of claim 23, wherein the predetermined font size is 10 point.

27. A method comprising:

receiving, by a processor, one or more input documents comprising a plurality of pages, each page of the plurality of pages having an original document contents, wherein the original document contents comprises a first dimension and a second dimension that define a first aspect ratio;

performing, by the processor, a modification of each page of the plurality of pages of the one or more input documents, comprising the steps of:

determining, by the processor, a first dimension of the page by measuring an image or a data structure of the original document contents in pixels;

calculating, by the processor, a sizing ratio by dividing a predetermined dimension associated with a standard size document by the first dimension;

creating a modified output page of a non-standard printing size by adding a new extended region to one side of the document contents while maintaining the first aspect ratio with respect to the original document contents, such that after the new extended region is added, the original document contents are contained within a subregion of the modified output page that comprises the first aspect ratio and is outside the new extended region;

calculating, by the processor, a label size for a label by multiplying a predetermined label size associated with the standard size document by the sizing ratio; and inserting, by the processor, a label having the label size into the new extended region, wherein the modified output page is formed by changing either the first dimension or the second dimension depending on an orientation of the input page while maintaining the first aspect ratio with respect to the original document contents.

28. A method comprising:

receiving, by a processor, one or more rectangular input pages having an original document contents, wherein the original document contents comprise a first height dimension and a first width dimension that define a first aspect ratio;

determining, by the processor, the first height dimension, the first width dimension, the first aspect ratio, and an orientation of the original document contents by measuring an image or a data structure of the original document contents in pixels;

creating, by the processor, a modified output page of a non-standard printing size for each of the one or more rectangular input pages by adding a new extended region at one of the four sides of each rectangular input page while maintaining the first aspect ratio with respect to the original document contents, thereby giving each modified output page a second aspect ratio that is different from the first aspect ratio;

identifying boundaries of the new extended region; and inserting, by the processor, a label within the boundaries of the new extended region, wherein, after the new extended region is added, the original document contents are contained within a subregion of the modified output page that comprises the first aspect ratio and is outside the new extended region, wherein the modified output page is formed by changing either a first overall height dimension or a first overall width dimension depending on the orientation of the rectangular input page, while maintaining the first aspect ratio with respect to the original document contents; and exporting the one or more modified output pages into an output document.

29. The method of claim 28, wherein the subregion maintains the first height dimension, the first width dimension, and the first aspect ratio, and wherein a position of the original document contents remains substantially unchanged in respect to three of the four sides of the input document after adding the new extended region, wherein the three of the four sides are distinct from the one of the four sides at which the new extended region was added.

30. The method of any one of claims 1, 21, 22, 23, 27, or 28 wherein the image or the data structure can be measured in, or converted into, inches or other standard units of measurement.

* * * * *